(12) United States Patent
Smit et al.

(10) Patent No.: US 10,394,866 B2
(45) Date of Patent: *Aug. 27, 2019

(54) SYSTEM AND METHOD FOR ASYNCHRONOUS CLIENT SERVER SESSION COMMUNICATION

(71) Applicant: MasterObjects, Inc., Zeist (NL)

(72) Inventors: Mark Hans Smit, Vetlanda (SE); Stefan M. van den Oord, Best (NL)

(73) Assignee: MasterObjects, Inc. (NL)

( * ) Notice: Subject to any disclaimer, the term of this patent is extended or adjusted under 35 U.S.C. 154(b) by 267 days.

This patent is subject to a terminal disclaimer.

(21) Appl. No.: 15/387,985

(22) Filed: Dec. 22, 2016

(65) Prior Publication Data

US 2017/0193114 A1 Jul. 6, 2017

Related U.S. Application Data

(63) Continuation of application No. 14/027,645, filed on Sep. 16, 2013, now Pat. No. 9,760,628, which is a continuation of application No. 13/366,905, filed on Feb. 6, 2012, now Pat. No. 8,539,024, which is a continuation of application No. 09/933,493, filed on Aug. 20, 2001, now Pat. No. 8,112,529.

(51) Int. Cl.
| | | |
|---|---|---|
| *G06F 16/338* | (2019.01) | |
| *G06F 17/24* | (2006.01) | |
| *G06F 16/951* | (2019.01) | |
| *G06F 16/958* | (2019.01) | |
| *G06F 17/27* | (2006.01) | |
| *H04L 29/06* | (2006.01) | |
| *H04L 29/08* | (2006.01) | |
| *G06F 8/33* | (2018.01) | |
| *G06F 3/023* | (2006.01) | |

(52) U.S. Cl.
CPC .......... *G06F 16/338* (2019.01); *G06F 16/951* (2019.01); *G06F 16/986* (2019.01); *G06F 17/243* (2013.01); *G06F 17/276* (2013.01); *H04L 29/06* (2013.01); *H04L 67/02* (2013.01); *H04L 67/142* (2013.01); *H04L 67/42* (2013.01); *G06F 3/0237* (2013.01); *G06F 8/33* (2013.01); *G06F 17/271* (2013.01); *H04L 67/38* (2013.01); *H04L 69/329* (2013.01)

(58) Field of Classification Search
CPC ..... Y10S 707/99933; Y10S 707/99936; G06F 17/30864; G06F 19/24
See application file for complete search history.

(56) References Cited

U.S. PATENT DOCUMENTS

| | | | | |
|---|---|---|---|---|
| 5,911,485 A | * | 6/1999 | Rossmann | ............ G06F 3/0237 341/20 |
| 5,963,671 A | * | 10/1999 | Comerford | ........... G06F 3/0237 345/168 |
| 2002/0059164 A1 | * | 5/2002 | Shtivelman | ......... H04L 12/1831 |

(Continued)

*Primary Examiner* — Barbara B Anyan

(57) ABSTRACT

The invention provides a session-based bi-directional multi-tier client-server asynchronous information database search and retrieval system for sending a character-by-character string of data to an intelligent server that can be configured to immediately analyze the lengthening string character-by-character and return to the client increasingly appropriate database information as the client sends the string.

16 Claims, 17 Drawing Sheets

(56) References Cited

U.S. PATENT DOCUMENTS

2009/0119581 A1\* 5/2009 Velusamy ............. G06F 17/276
715/256
2014/0136672 A1\* 5/2014 Sullivan ............. H04L 41/0273
709/223

\* cited by examiner

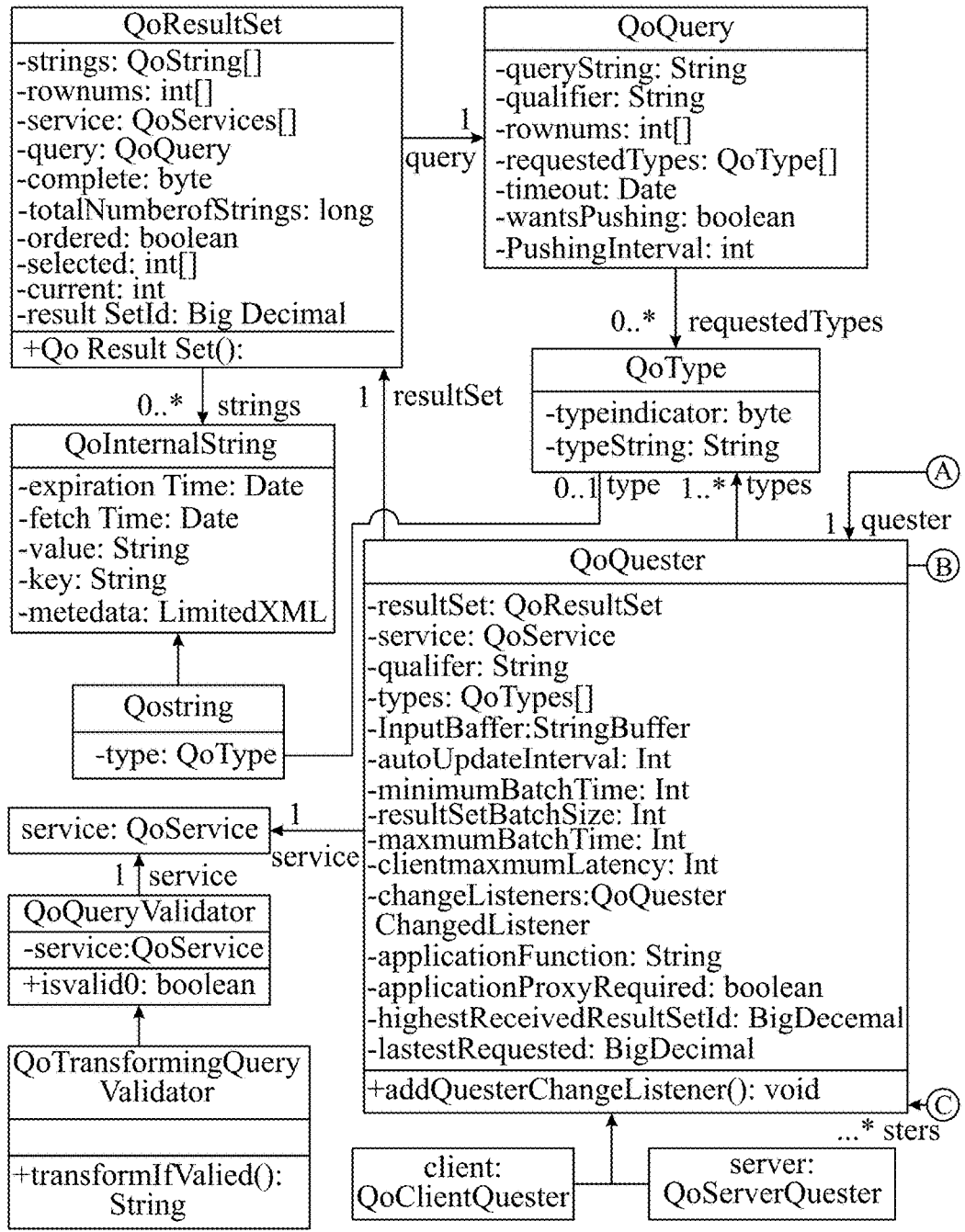
FIG. 8A (Cont..)

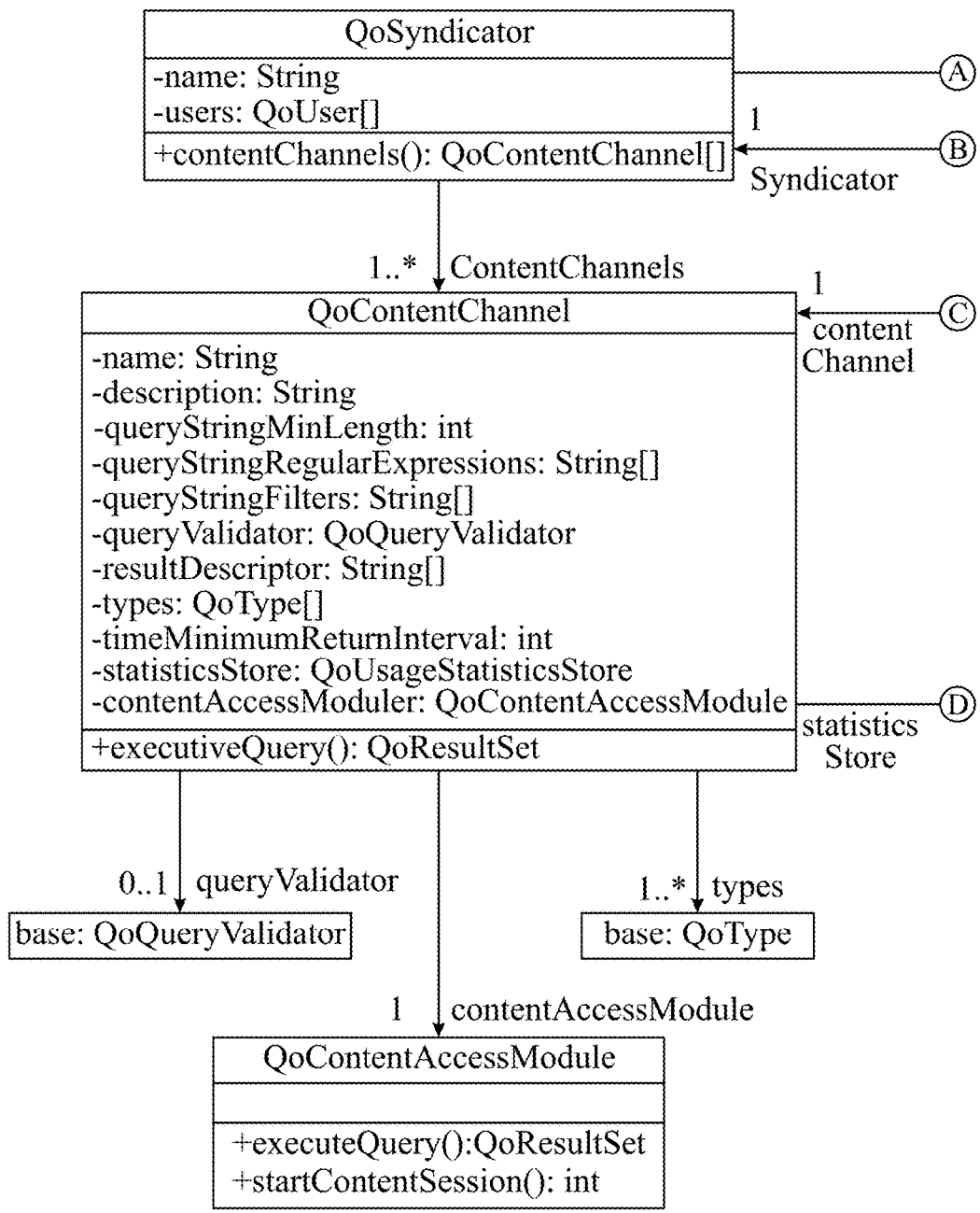
FIG. 8E (Cont..)

SYSTEM AND METHOD FOR ASYNCHRONOUS CLIENT SERVER SESSION COMMUNICATION

CLAIM OF PRIORITY

This application is a continuation application of U.S. patent application Ser. No. 14/027,645, filed Sep. 16, 2013, which is a continuation application of U.S. application Ser. No. 13/366,905, filed Feb. 6, 2012 which is now U.S. Pat. No. 8,539,024, issued on Sep. 17, 2013, which is a continuation of U.S. patent application Ser. No. 09/933,493 filed Aug. 20, 2001, which is now U.S. Pat. No. 8,112,529, issued on Feb. 7, 2012, entitled "SYSTEM AND METHOD FOR ASYNCHRONOUS CLIENT SERVER SESSION COMMUNICATION" by Mark H. Smit, et al, which applications are incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The invention relates generally to client-server communication systems, and particularly to a session-based bi-directional multi-tier client-server asynchronous search and retrieval system.

BACKGROUND OF THE INVENTION

A primary task of computer systems is to manage large quantities of information, generally referred to as data. The first computers typically stored data using off-line methods, for example by using punch cards and other primitive means. As built-in or on-line storage solutions became more affordable, data were instead stored in central memory banks. The first enterprise-wide computer systems consisted of central computers containing central data storage, and a large number of user terminals that accessed this server data by sending input and receiving output as characters to be displayed or printed at the terminal. Although these systems had a primitive user interface and data access became increasingly slower as the number of users grew, these systems nevertheless handled enterprise data with ease and great security.

The first servers, often referred to as mainframes or mini computers, ran on proprietary operating systems. Terminals usually had large input buffers where input was only checked against or committed to the server after entering text into a page or form. Many systems only displayed the character entered after it was received and confirmed by the server. Faster servers and more modern server operating systems, such as UNIX and VMS, offered several advantages in those users could receive immediate feedback after each character was typed.

At the beginning of the 1980s decade, the growing popularity of microcomputers and personal workstations made it possible to store data locally. Enterprise data was distributed over networks of computer systems. To access information it was no longer necessary to have a continuous connection to central databases, and instead it was possible to copy information to a personal computer, edit and work with it, and then save it back to a file or database server later. Most microcomputers worked with data in logical chunks or files. This brought a lot of power to end users, but introduced problems in managing the large quantity of enterprise data that was no longer stored as a unique entity in one place. For example, a file that was being edited by one user could not usually be accessed or modified by other users at the same time. It was also difficult to manage multiple copies of the same data.

Toward the end of the 1980's faster microcomputers and networks made it practical to work with enterprise data in smaller chunks than files. One example of this new technology was the development of Structured Query Language (SQL) relational databases which made it possible to divide software programs into a 'Client' tier and a 'Server' tier that communicated with each other over a network. Client-server computing thus made it possible to store information centrally, yet manage and work with it locally. In the client-server paradigm, the client systems concentrated on offering a user-friendly interface to server data, while the server systems were able to handle many client systems at once while safely managing enterprise data.

However, the increasing client-server computing introduced its share of problems. Protocols used to communicate between client and server became increasingly complex and difficult to manage. Enterprise IT departments needed increasingly greater resources to manage the proprietary implementations of client operating systems, server database systems and middleware protocols connecting the various 'tiers' of client-server systems. Data was no longer stored in one place but was required to be managed within a distributed network of systems. Client-server systems also lacked a major advantage of mainframes: in a client-server system any changes to the data on the server weren't immediately updated on the client.

Starting in the 1990's, the Internet has allowed businesses, organizations, and other enterprises to easily make information available to users without the complex architecture that client-server systems typically require. Today, an increasing number of software applications are moving their data and logic or functional processes back to the server tier, from which they can be accessed from the Internet by a wide variety of clients, including thin and very thin-clients, which typically consist of Internet browsers or small applications (applets) whose sole responsibility is providing an interface to the user. In many ways, Internet computing (often referred to as e-commerce) has brought back the data-handling advantages of mainframes. Within the e-commerce environment data that change on the server are immediately available to clients that access the data through the Internet (world-wide) or through an intranet (enterprise-wide).

Unfortunately, the rise of Internet commerce has also given rise to some of the disadvantages associated with mainframe technology. Most Internet connections that present data to the user or client process use the Hyper Text Transfer Protocol (HTTP) which is inherently "session-less." This means that, for example, there is no totally reliable way for the server to automatically update the client display once the server data change. It also means that the server only checks the validity of the client or user input after the user sends back or submits an entire input form. This apparent disadvantage has also played an important role in the success of the Internet: because HTTP connections are session-less, they require much less processing power and much less memory on the server, while the user is busy entering data. Thus, Internet applications running on web servers can be accessed by millions of people. Because HTTP and related Internet-based client-server systems do not provide continuous access to server data, systems sometimes incorporate lookup tables and pre-defined values that are cached locally. For example, a list of possible countries to be selected by a user of a web page can be sent to the user's computer when that page is first sent to the user and used thereafter for subsequent country selections. Client-server applications often pre-read the data from the server the moment an application or application window is opened, in order to present users with selection lists the moment they need them. This poses problems for data that frequently changes over time since the client system may allow users to select or enter data that is no longer valid. It also poses problems for large selection lists whose transmission to the client may take a long time.

To address this some systems incorporate a local cache of the data frequently accessed by the user. A web browser may, for example be configured to remember the last pages a user visited by storing them in a local cache file. A clear disadvantage of keeping such a local cache is that it is only useful as long as the user stays on the same client computer system. Also, the local cache may include references to web pages that no longer exist.

Some other systems with limited network bandwidth (like cell phones or personal organizers) can be deployed with built-in databases (such as dictionaries and thesauri), because it would be impractical to wait for the download of an entire database, which is needed before the data is of any use. This has the disadvantage that data stored in the device may no longer be up-to-date because it's really a static database. Also, the cost of cell phones and personal organizers is greatly increased by the need for megabytes of local storage. Another important consideration is that keeping valuable data in any local database makes it vulnerable to misuse and theft. What is needed is a mechanism that addresses these issues that allows a client-server system to retain some element of a session-based system, with its increase in performance, while at the same time offering a secure communication mechanism that requires little, if any, local storage of data.

Other attempts have been made to tackle some of the problems inherent with traditional computer system interfaces, and particularly with regard to user session administration and support. These attempts include the auto-complete function systems such as used in Microsoft Internet Explorer, the spell-as-you-go systems such as found in Microsoft Word, and the wide variety of client-server session managers such as Netopia's Timbuktu and Citrix Winframe.

Auto-Complete Functionality

Many current systems provide a mechanism to auto-complete words entered into fields and documents. This 'auto-complete' functionality is sometimes called 'type-ahead' or 'predictive text entry'. Many web browsers such as Microsoft's Internet Explorer application will automatically 'finish' the entry of a URL, based on the history of web sites visited. E-mail programs including Microsoft Outlook will automatically complete names and e-mail addresses from the address book and a history of e-mails received and sent. Auto-completion in a different form is found in most graphical user interfaces, including operating systems such as Microsoft Windows and Apple Mac OS, which present lists to the user: When the user types the first character of a list entry, the user interface list will automatically scroll down to that entry. Many software development tools will automatically complete strings entered into program source code based on a known taxonomy of programming-language dependent key words and 'function names' or class names' previously entered by the developer. Some cell phones and personal organizers also automatically type-ahead address book entries or words from a built-in dictionary. Auto-complete functionality facilitates easy entry of data based on prediction of what options exist for the user at a single moment in time during entry of data.

Checking as You Go

More and more word processing programs (most notably Microsoft Word and certain e-mail programs) include so-called 'spell checking as you type'. These programs automatically check the spelling of words entered while the user is typing. In a way, this can be seen as ' deferred auto-complete', where the word processor highlights words after they were entered, if they don't exist in a known dictionary. These spell checking programs often allow the user to add their own words to the dictionary. This is similar to the 'history lists' that are maintained for the auto-completion of URLs in a web browser, except that in this case the words are manually added to the list of possible completions' by the user.

Software Component Technologies

Software component technologies have provided a measure of component generation useful in client/server systems. One of these technologies is OpenDoc, a collaboration between Apple Computer, Inc. and IBM Corporation (amongst others) to allow development of software components that would closely interact, and together form applications. One of the promises of OpenDoc was that it would allow small developers to build components that users could purchase and link together to create applications that do exactly what the users want, and would make existing 'bloat-ware' applications (notably Microsoft Office and Corel's WordPerfect Office/Corel Office) redundant, but the technology was dropped several years ago in favor of newer technologies such as CORBA (Common Object Request Broker Architecture), developed by the Object Management Group to allow transparent communication and interoperability between software components.

Object-oriented languages and even non-object-oriented (database) systems have used component technologies to implement technical functionality. The NeXTstep operating system from NeXT Computer, Inc. (which was later acquired by Apple Computer, Inc. and evolved into the Mac operating system Mac OS X) had an object-oriented architecture from its original beginnings, which allowed software developers to create applications based on predefined, well-tested and reliable components. Components could be 'passive' user interface elements (such as entry fields, scroll areas, tab panes etc) used in application windows. But components could also be active and show dynamic data (such as a component displaying a clock, world map with highlight of daylight and night, ticker tape showing stock symbols, graphs showing computer system activity, etc.). The NeXT operating system used object frameworks in the Objective C language to achieve its high level of abstraction which is needed for components to work well. Later, Sun Microsystems, Inc. developed the Java language specification in part to achieve the same goal of interoperability. To date, Java has probably been the most successful 'open' (operating system independent) language used to build software components. It is even used on certain web sites that allow 'Java applets' on the user's Internet browser to continuously show up-to-date information on the client system.

WebObjects, an object-oriented technology developed by Apple Computer, Inc. is an Internet application server with related development tools, which was first developed by NeXT Computer, Inc. WebObjects uses object oriented frameworks that allow distribution of application logic between server and client. Clients can be HTML-based, but can also be Java applets. WebObjects uses proprietary technology that automatically synchronizes application objects between client and server. The layer that synchronizes data objects between the client and the server is called the 'Enterprise Object Distribution' (EODistribution), part of Apple's Enterprise Objects Framework (EOF), and is transparent to the client software components and the server software components.

Session Management

Both Netopia's Timbuktu remote access systems, and Citrix, Inc.'s Winframe terminal server product, allow some element of remote access to server applications from a client system. These products synchronize user data and server data, transparently distributing all user input to the server and return all server (display) output to the client. Timbuktu does this with very little specific knowledge about the application and operating system used. This allows it to transparently work on both Microsoft Windows and Mac OS platforms. Technologies similar to Timbuktu do exist and perform the same kind of 'screen sharing'. For example, the Virtual Network Computing (VNC) system is one example of an open source software program that achieves the same goals and also works with Linux and UNIX platforms.

Citrix Winframe has taken the same idea a step further by incorporating intimate knowledge of the Microsoft Windows operating system (and its Win32 APIs) to further optimize synchronization of user input and application output on the server. It can then use this detailed knowledge of the Microsoft Windows APIs to only redraw areas of the screen that it knows will change based on a user action: for example, Winframe may redraw a menu that is pulled down by the user without needing to access the server application because it knows how a menu will work.

Software Applications

Several application providers have also built upon these technologies to provide applications and application services of use to the end-user. These applications include computer-based thesauri, on-line media systems and electronic encyclopedia.

The International Standards Organization (as detailed further in ISO 2788-1986 Documentation—Guidelines for the Establishment and Development of monolingual thesauri and ISO 5964-1985 Documentation—Guidelines for the Establishment and Development of multilingual thesauri) determines suggested specifications for electronic thesauri, and thesaurus management software is now available from numerous software vendors world-wide. However, most systems have clear limitations that compromise their user-friendliness. Most commonly this is because they use a large third-party database system, such as those from Oracle Software, Inc. or Informix, Inc. as a back-end database. This means that any thesaurus terms that are displayed to the user are fetched from the database and then presented in a user interface. If one user changes the contents of the thesaurus, other users will only notice that change after re-fetching the data. While of little concern in small or infrequently changing environments, this problem is a considerable one within larger organizations and with rapidly updated content changes, for example in media publishing applications when thesaurus terms are being linked to new newspaper or magazine articles. This type of work is usually done by multiple documentalists (media content authors) simultaneously. To avoid 'mixing up' terms linked to articles, each documentalist must be assigned a certain range of articles to 'enrich' (which in one instance may be the act of adding metadata and thesaurus terms to a document). Clearly, in these situations there is a great need for live updates of data entered by these users, but a similar need exists for all client-server database programs.

SUMMARY OF THE INVENTION

The invention provides a system that offers a highly effective solution to the aforementioned disadvantages of both client-server and Internet systems by providing a way to synchronize the data entered or displayed on a client system with the data on a server system. Data input by the client are immediately transmitted to the server, at which time the server can immediately update the client display. To ensure scalability, systems built around the present invention can be divided into multiple tiers, each tier being capable of caching data input and output. A plurality of servers can be used as a middle-tier to serve a large number of static or dynamic data sources, herein referred to as "content engines."

The present invention may be incorporated in a variety of embodiments to suit a correspondingly wide variety of applications. It offers a standardized way to access server data that allows immediate user-friendly data feedback based on user input. Data can also be presented to a client without user input, i.e. the data are automatically pushed to the client. This enables a client component to display the data immediately, or to transmit the data to another software program to be handled as required.

The present invention can also be used to simply and quickly retrieve up-to-date information from any string-based content source. Strings can be linked to metadata allowing user interface components to display corresponding information such as, for example, the meaning of dictionary words, the description of encyclopedia entries or pictures corresponding to a list of names.

Embodiments of the present invention can be used to create a user interface component that provides a sophisticated "auto-completion" or "type-ahead" function that is extremely useful when filling out forms. This is analogous to simple, client-side auto-complete functions that have been widely used throughout the computing world for many years. As a user inputs data into a field on a form, the auto-complete function analyzes the developing character string and makes intelligent suggestions about the intended data being provided. These suggestions change dynamically as the user types additional characters in the string. At any time, the user may stop typing characters and select the appropriate suggestion to auto-complete the field.

Today's client-side auto-complete functions are useful but very limited. The invention, however, vastly expands the usefulness and capabilities of the auto-complete function by enabling the auto-complete data, logic and intelligence to reside on the server, thus taking advantage of server-side power. Unlike the client-side auto-complete functions in current use, an auto-complete function created by the present invention generates suggestions at the server as the user types in a character string. The suggestions may be buffered on a middle tier so that access to the content engine is minimized and speed is optimized.

The simple auto-complete schemes currently in popular use (such as email programs that auto-complete e-mail addresses, web browsers that auto-complete URLs, and cell phones that auto-complete names and telephone numbers) require that the data used to generate the suggestions be stored on the client. This substantially limits the flexibility, power, and speed of these schemes. The present invention, however, stores and retrieves the auto-complete suggestions from databases on the server. Using the present invention, the suggestions generated by the server may, at the option of the application developer, be cached on the middle tier or on the client itself to maximize performance.

The present invention provides better protection of valuable data than traditional methods, because the data is not present on the client until the moment it is needed, and can be further protected with the use of user authentication, if necessary.

The present invention is also useful in those situations that require immediate data access, since no history of use needs to be built on the client before data is available. Indeed, data entered into an application by a user can automatically be made available to that user for auto-completion on any other computer, anywhere in the world.

Unlike existing data-retrieval applications, server data can be accessed through a single standardized protocol that can be built into programming languages, user interface components or web components. The present invention can be integrated into and combined with existing applications that access server data. Using content access modules, the present invention can access any type of content on any server.

In the detailed description below, the present invention is described with reference to a particular embodiment named QuestObjects. QuestObjects provides a system for managing client input, server queries, server responses and client output. One specific type of data that can be made available through the system from a single source (or syndicate of sources) is a QuestObjects Service. Other terms used to describe the QuestObjects system in detail can be found in the glossary given below.

QuestObjects is useful for retrieval of almost any kind of string-based data, including the following QuestObjects Service examples:
Intranet Use
Access system for database fields (for lookup and auto-complete services)
Enterprise thesauri system.
Enterprise search and retrieval systems.
Enterprise reference works.
Enterprise address books.
Control systems for sending sensor readings to a server that responds with appropriate instructions or actions to be taken.
Internet Use
Client access to dictionary, thesaurus, encyclopedia and reference works.
Access to commercial products database.
Literary quotes library.
Real-time stock quote provision.
Access to real-time news service.
Access to Internet advertisements.
Access to complex functions (bank check, credit card validation, etc).
Access to language translation engines.
Access to classification schemes (e.g., Library of Congress Subject Headings).
Access to lookup lists such as cities or countries in an order form.
Personal address books.
Personal auto-complete histories.

BRIEF DESCRIPTION OF THE FIGURES

FIG. 8A-8B shows an object model of an embodiment of the present invention, displaying the base part.

FIG. 8E-8F shows an object model of an embodiment of the present invention, displaying the service part.

DETAILED DESCRIPTION

Figure 1:
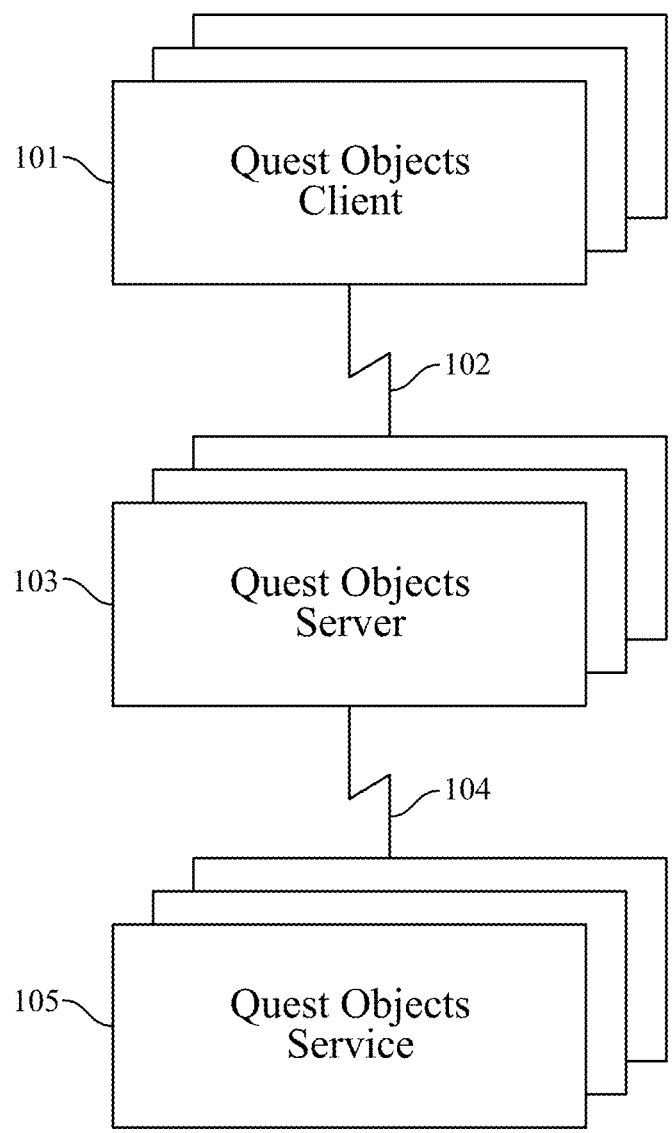
FIG. 1 shows a general outline of a system incorporating the present invention.

Roughly described, the invention provides a session-based bi-directional multi-tier client-server asynchronous information database search and retrieval system for sending a character-by-character string of data to an intelligent server that can be configured to immediately analyze the lengthening string character-by-character and return to the client increasingly appropriate database information as the client sends the string.

The present invention includes a system that offers a highly effective solution to an important disadvantage of both client-server and Internet systems: The present invention provides a standardized way to immediately synchronize the data entered or displayed on a client system with the data on a server system. Data input by the client is immediately transmitted to the server at which time the server can immediately update the client display. To ensure scalability, systems built around the present invention can be divided into multiple 'tiers' each capable of caching data input and output. Any number of servers can be used as a middle-tier to serve any number of static or dynamic data sources (often referred to as "Content Engines").

The present invention is useful for an extremely wide variety of applications. It offers a standardized way to access server data that allows immediate user-friendly data feedback based on user input. Data can also be presented to a client without user input, i.e. the data is automatically 'pushed' to the client. This enables a client component to display the data immediately or to transmit it to another software program to be handled as required.

The present invention is also particularly useful for assistance in data entry applications, but can also be used to simply and quickly retrieve up-to-date information from essentially any string-based content source. Strings can be linked to metadata allowing user interface components to display corresponding information such as the meaning of dictionary words, the description of encyclopedia entries or pictures corresponding to a list of names.

In some embodiments, the present invention can be used to create a user interface component that provides a sophisticated "auto-completion" or "type-ahead" function that is extremely useful when filling out forms. Simple, client-side auto-complete functions have been widely used throughout the computing world for many years. As a user inputs data into a field on a form, the auto-complete function analyzes the developing character string and makes "intelligent" suggestions about the intended data being provided. These suggestions change dynamically as the user types additional characters in the string. At any time, the user may stop typing characters and select the appropriate suggestion to auto-complete the field.

Today's client-side auto-complete functions are very limited. The present invention vastly expands the usefulness and capabilities of the auto-complete function by enabling the auto-complete data, logic and intelligence to reside on the server thus taking advantage of server-side power. Unlike the client-side auto-complete functions in current use, an auto-complete function created by the present invention pushes suggestions from the server as the user types in a character string. Using the present invention, the suggestions may be buffered on a middle tier so that access to the content engine is minimized and speed is optimized.

The simple auto-complete schemes currently in popular use (such as email programs that auto-complete e-mail addresses, web browsers that auto-complete URLs, and cell phones that auto-complete names and telephone numbers) require that the data used to generate the suggestions be stored on the client. This substantially limits the flexibility, power, and speed of these schemes. The present invention, however, stores and retrieves the auto-complete suggestions from databases on the server. Using the present invention, the suggestions generated by the server may, at the option of the application developer, be cached on the middle tier or one the client itself to maximize performance.

The present invention provides better protection of valuable data because the data is not present on the client until the moment it is needed and can be further protected with a user authentication mechanism, if necessary.

The present invention is useful for immediate data use, since no use history must be built on the client before data is available. Indeed, data entered into an application by a user can automatically be made available to that user for auto-completion on any other computer anywhere in the world.

Unlike existing data-retrieval applications, server data can be accessed through a single standardized protocol that can be built into programming languages, user interface components or web components. The present invention can be integrated into, and combined with, existing applications that access server data. Using Content Access Modules, the present invention can access any type of content on any server.

In the detailed description below, an embodiment of the present invention is referred to as QuestObjects, and provides a system of managing client input, server queries, server responses and client output. One specific type of data made available through the system from a single source (or syndicate of sources) is referred to as a QuestObjects Service. Other terms used to describe the QuestObjects system in detail can be found in the glossary below:

Glossary

Active Component—Part of a software program that accesses the QuestObjects system through one or more Questers. Active Components may provide a user interface, in which case they're referred to as Questlets.
AppHost Synchronizer—Part of the QuestObjects Server that allows the Application Proxy access to data in Server Questers.
Application Proxy—An optional method implemented by the QuestObjects Server allowing the use of the QuestObjects system in client systems that do not allow the QuestObjects—Client components to communicate to the application server or web server directly. Uses the AppHost Synchronizer on the QuestObjects Server to send selected strings and metadata to the application server or web server using a QuestObjects Adaptor.
Client Controller—A QuestObjects Controller on a QuestObjects Client.
Client Quester—A Quester on a QuestObjects Client that has a Server Quester as its peer.
Client Session—A temporary container of information needed to manage the lifespan of Server Questers in a QuestObjects Server.
Content Access Module—A part of a Content Channel that provides a standardized API to access specific types of Content Engines.
Content-based Cache—A persistent store of Queries and corresponding Result Sets executed by a Content Engine for a specific Content Channel.
Content Channel—A part of the QuestObjects system that provides one type of information from one Content Engine. Consists of a Query Manager and a Content Access Module, linking a Content Engine to the QuestObjects system.
Content Engine—A dynamic data source that provides data to a Content Channel by accessing its own database or by querying other information systems.
Query Filter—A filter specified by a Query Manager in a specific Service used to tell the Server Quester to interpret incoming strings before they are sent to the Service as a QuestObjects Query.
Query Manager—An intelligent part of a Content Channel that interprets QuestObjects Queries and sends them to a Content Engine (through a Content Access Module) or retrieves results from the Content-based Cache in a standardized way. The Query Manager can also send a list of Query Patterns and Query Filters to the Server Quester, allowing the Server Quester to match and filter new Queries before they are sent to the Content Channel.
Query Pattern—A string-matching pattern (such as a unix-style grep pattern) specified by a Query Manager in a specific Service used to tell the Server Quester to interpret incoming strings before they are sent to the Service as a QuestObjects Query.

Persistent Quester Store—A dynamic database of Questers that is maintained on the QuestObjects Server, allowing Questers to be stored across Client sessions whereby the state and contents of the Client are automatically restored when a new Client Session is started.

Quester—An intelligent non-visual object contained by an Active Component that links a QuestObjects StringList to an input buffer. Questers exist on both the QuestObjects Client and the QuestObjects Server and can be specifically referred to as Client Quester and Server Quester. Questers communicate with each other through a QuestObjects Controller.

Questlet—A User Interface Element that accesses the QuestObjects system through one or more Questers. A visual Active Component.

QuestObjects Adaptor—An optional software component for existing application servers and web servers that allows these servers to use data entered into the QuestObjects system by users of client systems and web browsers that require an Application Proxy.

QuestObjects Client—Part of the QuestObjects system that functions as the client tier consisting of one or more Client Questers and a Client Controller that communicates to a QuestObjects Server.

QuestObjects Controller—An intelligent non-visual component that provides the interface between Questers on QuestObjects Clients and QuestObjects Servers. QuestObjects Controllers implement the protocol of the present invention.

QuestObjects Query—A string created by the Server Quester with optional qualifier and the requested row numbers forming a query to be executed by a specified QuestObjects Service.

QuestObjects Result Set—A set of StringLists with corresponding Query returned from the QuestObjects Service, returned in batches to the Client Quester by the Server Quester.

QuestObjects Server—Central part of the QuestObjects system that provides the link between any number of QuestObjects Clients, any number of QuestObjects Services, and any number of other QuestObjects Servers. Maintains Client Sessions that QuestObjects Clients communicate with through the Server Controller. Provides services such as caching, replication and distribution.

QuestObjects Service—One of the Content Channels provided by a specific Syndicator. A logical name for a Syndicator, a Content Channel and its corresponding Content Engine.

QuestObjects String—Sequence of Unicode characters with standardized attributes used by the QuestObjects system.

QuestObjects StringList—Container for a set of QuestObjects Strings retrieved from a QuestObjects Service with standardized attributes needed by the QuestObjects System.

QuestObjects User—Person or process accessing the QuestObjects system from the QuestObjects Client, optionally authorized by the Syndicator.

Server Controller—A QuestObjects Controller on a QuestObjects Server.

Server Quester—A Quester on a QuestObjects Server that has a Client Quester as its peer. Syndicator—A part of the QuestObjects system that offers one or more Content Channels to be used by QuestObjects Servers, performing user-based accounting services based on actual data use such as billing, collection of statistics and management of preferences. User Interface Element—A visual and optionally interactive component in a software program that provides an interface to the user.

The present invention provides a system that allows clients or client applications to asynchronously retrieve database information from a remote server of server application. The terms "client" and "server" are used herein to reflect a specific embodiment of the invention although it will be evident to one skilled in the art that the invention may be equally used with any implementation that requires communication between a first process or application and a second process or application, regardless of whether these processes comprise a typical client-server setup or not. The invention includes a Server, that handles requests for information from clients, and a communication protocol that is optimized for sending single characters from a Client to the Server, and lists of strings from the Server to the Client. In one embodiment, as the Server receives a single character from the Client, it immediately analyzes the lengthening string of characters and, based on that analysis, returns database information to the Client in the form of a list of strings. Clients are not restricted to programs with a user interface. Generally, any process or mechanism that can send characters and receive string lists can be considered a client of the system. For example, in an industrial or power supply setting, the control system of a power plant could send sensor readings to the system, and in return receive lists of actions to be taken, based on those sensor readings.

The system's protocol is not restricted to sending single characters. In fact, Clients can also use the protocol to send a string of characters. For example, when a user replaces the contents of an entry field with a new string, the Client may then send the entire string all at once to the Server, instead of character by character.

In accordance with one embodiment of the invention the system is session-based, in that the server knows or recognizes when subsequent requests originate at the same Client. Thus, in responding to a character the Server receives from a Client it can use the history of data that has been sent to and from the current user. In one embodiment, the system stores user preferences with each Service, so that they are always available to the Client, (i.e., they are independent of the physical location of the client). Furthermore, client authentication and a billing system based on actual data and content use by Clients are supported. For faster response, the Server may predict input from the Client based on statistics and/or algorithms.

The system is bi-directional and asynchronous, in that both the Client and the Server can initiate communications at any moment in time. The functionality of the system is such that it can run in parallel with the normal operation of clients. Tasks that clients execute on the system are non-blocking, and clients may resume normal operation while the system is performing those tasks. For example, a communication initiated by the Client may be a single character that is sent to the Server, which responds by returning appropriate data. An example of a communication initiated by the Server is updating the information provided to the client. Because the system is session-based it can keep track of database information that has been sent to the Client. As information changes in the database, the Server sends an updated version of that information to the Client.

Embodiments of the system may be implemented as a multi-tier environment. This makes it scalable because the individual tiers can be replicated as many times as necessary, while load balancing algorithms (including but not limited to random and round robin load-balancing) can be used to distribute the load over the copies of the tiers. One skilled in the art would appreciate that it is not necessary to replicate the tiers. Indeed, there may be only a single copy of each tier, and that all tiers (Client, Server, and Service) may be running on a single computer system.

FIG. 1 illustrates the general outline of a system that embodies the present invention. As shown in FIG. 1 there may be various Clients 101 using the system. These Clients use a communication protocol 102 to send information, including but not limited to single characters, and to receive information, including but not limited to lists of strings and corresponding metadata. At least one Server 103 receives information from the Client, and sends information to the Client. In a typical embodiment if there is a plurality of Servers, then the system can be designed so that each Client connects to only one of them, which then relays connections to other Servers, possibly using load-balancing algorithms. Servers have a communication link 104 to a Service 105, which they use to obtain the information that they send to the Client.

Figure 2:
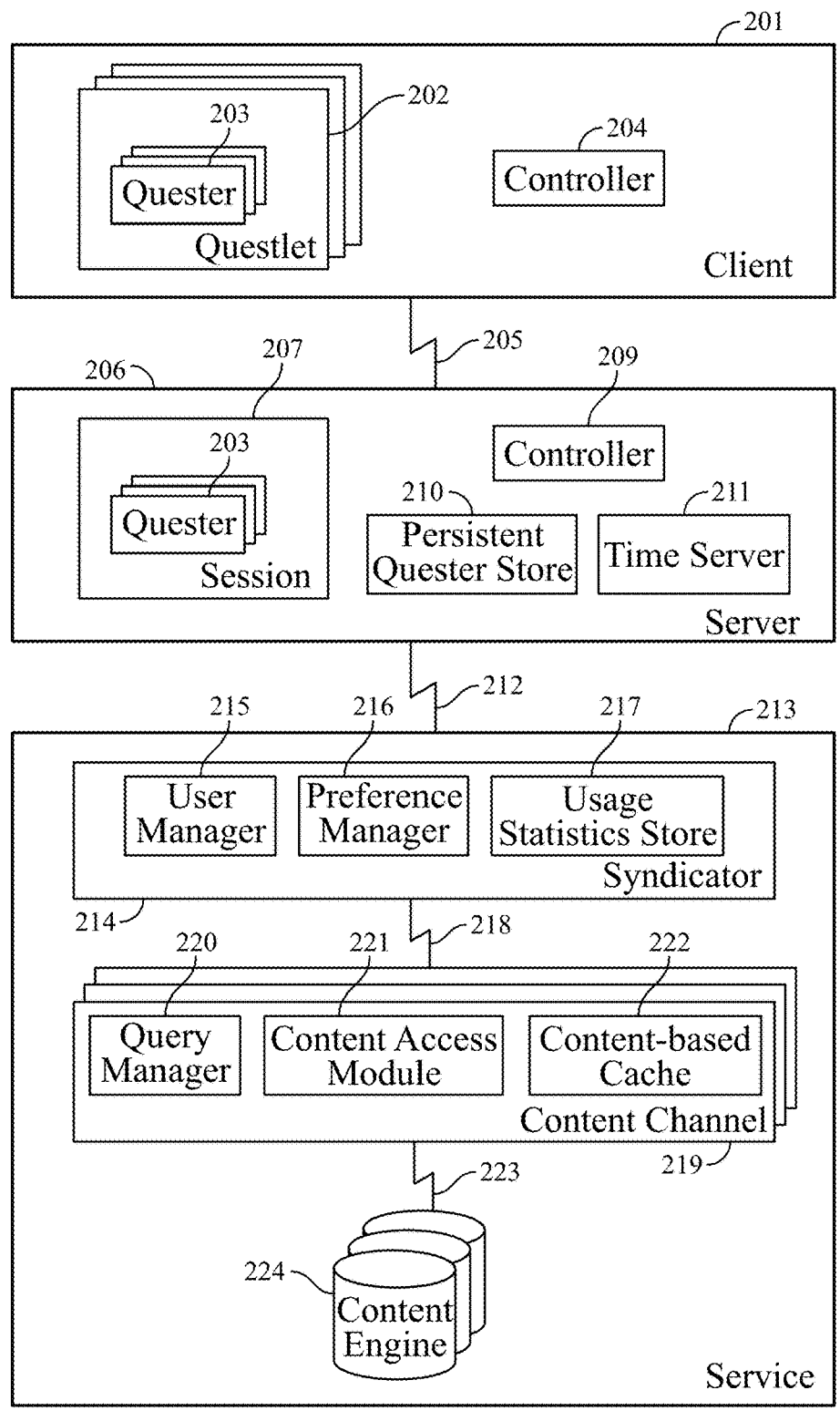
FIG. 2 shows a schematic of a system in accordance with an embodiment of the invention.

FIG. 2 is a schematic illustrating an embodiment of the present invention, and displays a five-tier system that has a user interface in which user interface elements use the present invention to assist the user in performing its tasks. For purposes of illustration, FIG. 2 displays just one session and one content Service. In an actual implementation there may be multiple concurrently active sessions, and there may be more than one content Service that Clients can use. As shown herein, the first of the five tiers is a Client tier 201. The Client tier contains the user interface and the Client components that are needed to use the system. The second tier is a Server or server process 206, which handles the queries that Clients execute, and in return displays results to the Client. Service 213, which corresponds to 105 of FIG. 1, is a logical entity consisting of three more tiers: a Syndicator 214, a Content Channel 219 and a Content Engine 224. The Syndicator provides access to a number of Content Channels and performs accounting services based on actual data use. The Content Channel provides a specific type of information from a specific source (i.e. the Content Engine). The Content Engine is the actual source of any content that is made available through the QuestObjects system. The Client tier 201 corresponds to the client 101 in FIG. 1. In this example, the Client may be an application (and in some embodiments a web application) with a user interface that accesses the system of the present invention. As used in the context of this disclosure a user interface element that uses the present invention is referred to as a "Questlet." A Client can contain one or more Questlets 202 (e.g. an input field or a drop down list. FIG. 3 described later contains three examples of such Questlets. A Questlet is always associated with at least one Client Quester 203. Questers are objects that tie a QuestObjects input buffer (containing input from the Client) to a QuestObjects Result Set returned from a QuestObjects Server. Questers exist on both the Client and Server, in which case they are referred to as a Client Quester and a Server Quester, respectively. Every Client Quester has one corresponding Server Quester. In accordance with the invention, any event or change that happens in either one of them is automatically duplicated to the other so that their states are always equal. This synchronization mechanism is fault-tolerant so that a failure in the communication link does not prevent the Questers from performing tasks for which they do not need to communicate. For example, a Client Quester can retrieve results from the cache, even if there is no communication link to the Server. Each single Quester accesses exactly one QuestObjects Service, i.e. one specific Content Channel offered by one specific Syndicator. At initialization of the Client, the Questlet tells its Quester which Service to access. In one embodiment a Service is stored or made available on only one Server within a network of Servers. However, this is transparent to the Client because each Server will forward requests to the right computer if necessary. The Client does not need to know the exact location of the Service.

To communicate with its Server Quester 208, each Quester in a session uses a controller 204. The system contains at least one Client Controller 204 and a Server Controller 209, which together implement the network communication protocol 205 of the present invention. Client Controllers may cache results received from a Server, thus eliminating the need for network traffic when results are reused.

Client Questers are managed by a Questlet, which create and destroy Questers they need. In a similar fashion, Server Questers are managed by a Session 207. When a Client Quester is created, it registers itself with the Client Controller. The Client controller forwards this registration information as a message to the Session using the Server Controller. The Session then checks if the Persistent Quester Store 210 contains a stored Quester belonging to the current user matching the requested Service and Query Qualifier. If such a Quester exists, it is restored from the Persistent Quester Store and used as the peer of the Client Quester. Otherwise, the Session creates a new Server Quester to be used as the Client Quester's peer.

A Time Server 211 provides a single source of timing information within the system. This is necessary, because the system itself may comprise multiple independent computer systems that may be set to a different time. Using a single-time source allows, for example, the expiration time of a Result Set to be calibrated to the Time Server so that all parts of the system determine validity of its data using the same time.

Server communication link 212 is used by the Server to send requests for information to a Service, and by a Service to return requested information. Requests for information are Query objects that are sent to and interpreted by a specific Service. Query objects contain at least a string used by the Service as a criterion for information to be retrieved, in addition to a specification of row numbers to be returned to the Client. For example, two subsequent queries may request row numbers 1 through 5, and 6 through 10, respectively. A query object may also contain a Qualifier that is passed to the appropriate Service. This optional Qualifier contains attributes that are needed by the Service to execute the Query. Qualifier attributes may indicate a desired sort order or in the example of a thesaurus Service may contain a parameter indicating that the result list must contain broader terms of the Query string. Services use the communication link to send lists of strings (with their attributes and metadata) to Servers. Server communication link 212 is also used by Server Questers to store and retrieve user preferences from a Syndicator's Preference Manager.

Questers use Services to obtain content. A Service is one of the Content Channels managed by a Syndicator. When a Quester is initialized, it is notified by its Active Component of the Service it must use. The Service may require authentication, which is why the Syndicator provides a User Manager 215. If a Client allows the user to set preferences for the Service (or preferences needed by the Active Component), it may store those preferences using the Syndicator's Preference Manager 216. The Server (i.e. Server Quester) only uses the Syndicator for authentication and preferences. To obtain content, it accesses the appropriate Content Channel directly. The Content Channel uses its Syndicator to store usage data that can be later used for accounting and billing purposes. Usage data is stored in a Usage Statistics Store 217.

Content communication link 218 is used by Content Channels to send usage data to their Syndicator, and to retrieve user information from the Syndicator. The Content Channel is a layer between the QuestObjects System, and the actual content made available to the system by a Content Engine 224. Each Content Channel has a corresponding Query Manager 220 that specifies the type of query that can be sent to the corresponding Content Engine, and defines the types of data that can be returned by the Content Channel.

Specification of query type comprises a set of Query Patterns and Query Filters that are used by the Server Quester to validate a string before the string is sent to the Content Channel as a QuestObjects Query. For example, a query type "URL" may allow the Server Quester to check for the presence of a complete URL in the input string before the input string is sent to the Content Channel as a query. A query type "date" might check for the entry of a valid date before the query is forwarded to the Content Channel.

The Query Manager optionally defines the types of string data that can be returned to the Client by the Content Channel. Specific Active Components at the Client can use this information to connect to Services that support specific types of data. Examples of string types include: simple terms, definitional terms, relational terms, quotes, simple numbers, compound numbers, dates, URLs, e-mail addresses, preformatted phone numbers, and specified XML formatted data etc.

The Query Manager 220 retrieves database information through a Content Access Module 221. The Content Access Module is an abstraction layer between the Query Manager and a Content Engine. It is the only part of the system that knows how to access the Content Engine that is linked to the Content Channel. In this way, Query Managers can use a standardized API to access any Content Engine. To reduce information traffic between Content Channels and Content Engines, Content Channels may access a content-based cache 222 in which information that was previously retrieved from Content Engines is cached. Engine communication link 223 is used by Content Access Modules to communicate with Content Engines. The protocol used is the native protocol of the Content Engine. For example, if the Content Engine is an SQL based database system then the protocol used may be a series of SQL commands. The Content Access Module is responsible for connecting the Content Engine to the QuestObjects System.

Content Engines 224 are the primary source of information in the system. Content Engines can be located on any physical computer system, may be replicated to allow load balancing, and may be, for example, a database, algorithm or search engine from a third-party vendor. An example of such an algorithm is Soundex developed by Knuth. Content Engines may require user authentication, which, if required, is handled by the Syndicator (through the Content Access Module).

The invention uses Content Engines as a source of strings. One skilled in the art would understand that a string may, for example, contain a URL of, or a reference to any resource, including images and movies stored on a network or local drive. Furthermore, strings may have metadata associated with them. In one embodiment, strings might have a language code, creation date, modification date, etc. An entry in a dictionary may have metadata that relates to its pronunciation, a list of meanings and possible uses, synonyms, references, etc. A thesaurus term may have a scope note, its notation, its source and its UDC coding as metadata, for example. Metadata of an encyclopedia entry may include its description, references, and links to multi-media objects such as images and movies. A product database may have a product code, category, description, price, and currency as metadata. A stock quote may have metadata such as a symbol, a company name, the time of the quote, etc. Instructions to a control system may contain parameters of those instructions as metadata. For example, the instruction to open a valve can have as metadata how far it is to be opened.

Figure 3A:
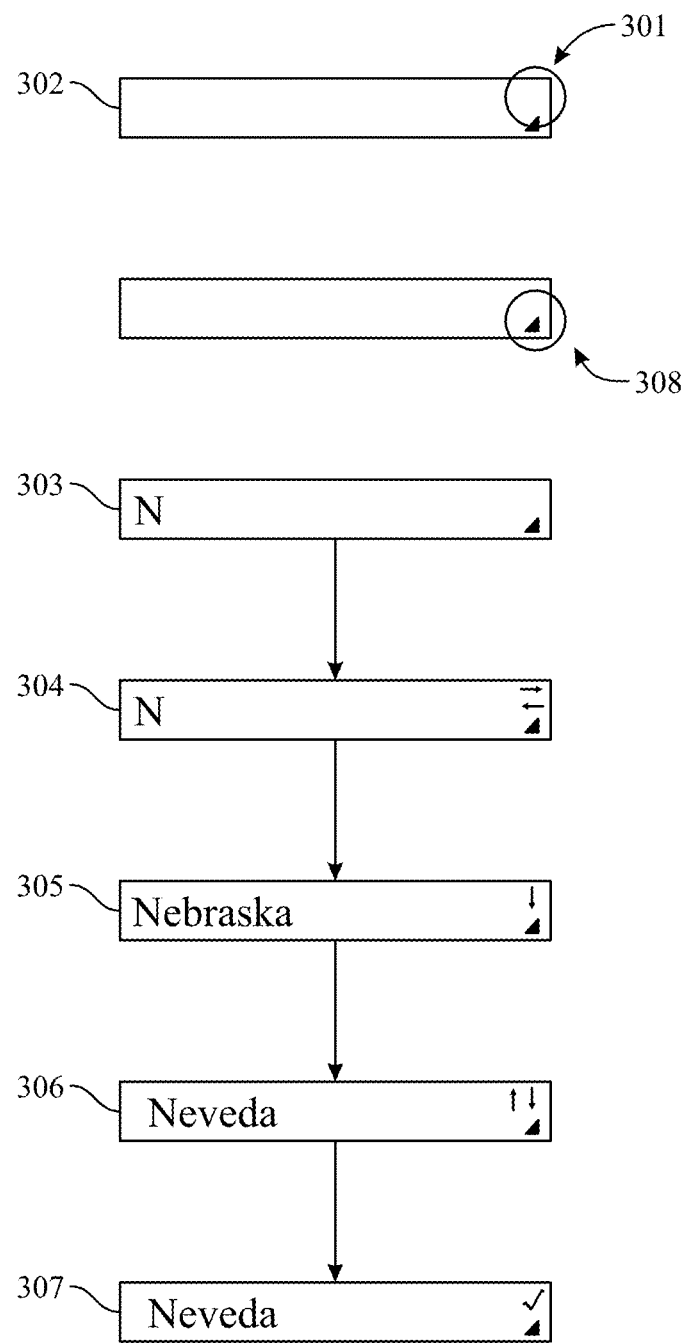
FIG. 3A shows a variety of stages in the usage of a sample Questlet implementation in accordance with an embodiment of the invention.
Figure 3B:
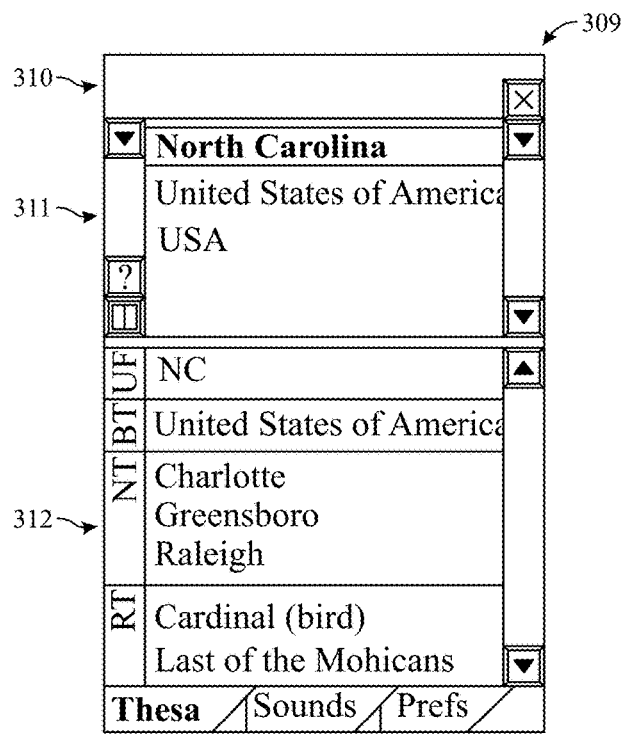
FIG. 3B shows an expanded view of a sample Questlet implementation in accordance with an embodiment of the invention.
Figure 3C:
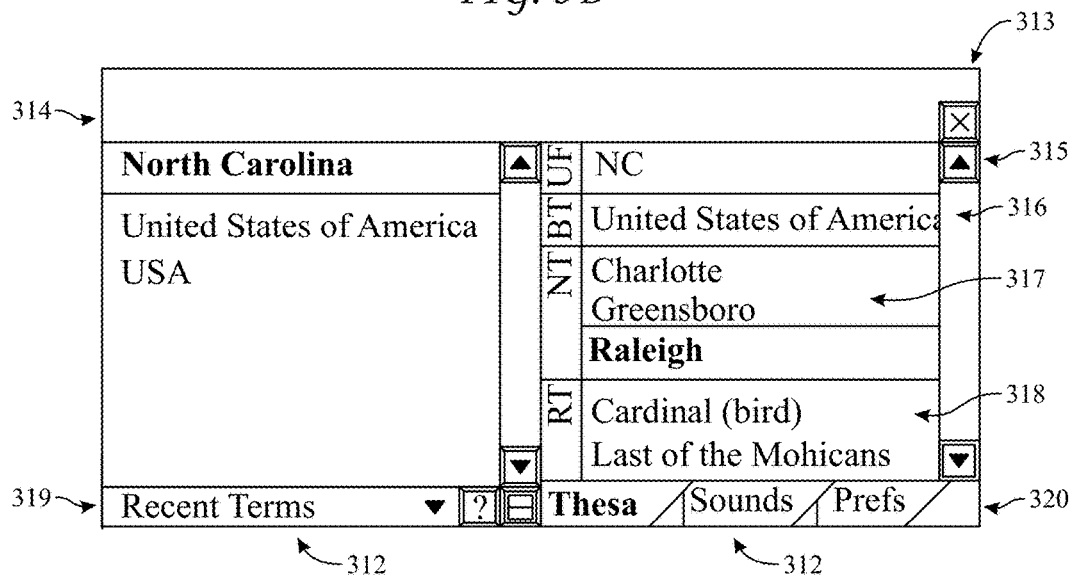
FIG. 3C shows an expanded view of a sample Questlet implementation in accordance with an embodiment of the invention.

FIGS. 3A-3C contain three examples of the Questlets that can be used with the system, i.e., the User Interface Elements that access the QuestObjects system. In FIG. 3A, a series of representations of an auto-completing entry field are shown, such as might be used in an application window or on a web form, that accesses a single QuestObjects Service, and allows for auto-completion of, in this example, a U.S. state name. FIGS. 3B and 3C depict two different presentation forms of the same complex Questlet that access a number of QuestObjects Services simultaneously.

Users should be able to clearly recognize the availability of QuestObjects Services in an application. As shown in FIG. 3A, and particularly in the auto-complete entry field example screen element 302, clear symbols are displayed at the right end of the field. A small disclosure triangle 308 is displayed in the lower right-hand corner, and serves as an indicator to the user that a QuestObject is being used. A reserved space herein referred to as the "status area", and located above the disclosure triangle 301 is used to display information about the state of the QuestObjects system. The successive shots of this screen element 302 through 307 show some of the different kinds of states in this status area. Screen element 302 depicts an empty data field with an empty status area. The screen element 303 shows the same field immediately after the user enters a character "N". On receiving the "N" input, the Questlet immediately checks its internal entry cache for available auto-complete responses. If the cache does not contain a valid string (either because the cache is empty, because the cache is incomplete for the entry character or because one or more cached strings have expired) the QuestObjects system sends a query to the QuestObjects Service. This sending process is indicated by a network access symbol in the status area 304 which is in this embodiment takes the form of a left and right facing arrows.

Screen element 305 shows the entry field after the Server has sent one or more auto-complete strings back to the Questlet. This example situation is typical of these instances in which the user did not enter a second character after the original "N" before the QuestObjects system responded. The QuestObjects system is inherently multi-threaded and allows the user to continue typing during access of the QuestObjects Service. The screen element status area of 305 now displays a small downward facing arrow indicating that there are more available auto-complete answers. In this case, the entry field has displayed the first one in alphabetic order.

Screen element 306 shows the same entry field after the user has hit the down arrow key or clicked on the arrow symbol in the status area. The next available auto-complete response in alphabetical order is displayed. The double up and down pointing arrows in the status area now indicate that both a previous response (in this example, "Nebraska") and a next response are available.

Screen element 307 shows the same entry field after the user has typed two additional characters, "e" and "v". As shown in this example, the status area changes to a checkmark indicating that there is now only one available auto-complete match for the characters entered. The user can at any point use the backspace key on their keyboard (or perform other actions defined in the Questlet) to select different states, or can leave the entry field to confirm his selection. At this time, the system may do several things. It can automatically accept the string "Nevada" and allow the user to move on with the rest of the entry form; or if it has been configured such it may decide to replace the string "Nevada" by the two-character state code. The QuestObjects Service not only returns strings, but also any corresponding metadata. This example of an auto-complete entry field Questlet is based on showing the response string, but other Questlets (and even invisible Active Components) may perform an action invisible to the user. In addition, a response sent to one Questlet can trigger a response in other Questlets that have a pre-defined dependency to that Questlet. For example, entering a city into one Questlet can trigger another Questlet to display the corresponding state. It will be evident to one skilled in the art, that although left, right, up and down arrows are used to indicate usually the status of the QuestObject field, other mechanisms of showing the status within the scope and spirit of the invention.

Interdependent data (which in the context of this disclosure is that data originating from a multitude of QuestObjects Services) can be combined into a complex Questlet. Examples 309 shown in FIG. 3B and example 313 shown in FIG. 3C show a complex user interface element (Questlet) that makes multiple QuestObjects Services available to the user. In both examples the upper part of the Questlet is an entry field that may offer the auto-complete functionality described in FIG. 3A. By clicking on the disclosure triangle 308 shown in the earlier FIG. 3A (or by another action), the user can disclose the rest of the Questlet, which in this example comprises two functional areas 311 and 312. In this example, the user interface allows the user to choose a vertical presentation mode 309, shown in FIG. 3B or a horizontal presentation mode 313, shown in FIG. 3C for the Questlet. A close box 310 replaces the disclosure triangle in the entry field, allowing the user to close areas 311 and 312. In FIG. 3C Area 314 shows a certain QuestObjects Service, in this case a list of "Recent Terms" accessed by the user. This Questlet allows the user to select a different QuestObjects Service for area 314 by selecting it from a popup list 319. In this example, an appropriate second Service might be "Alphabetic Listing".

In both examples of FIGS. 3B and 3C, area 312 displays a QuestObjects "Thesaurus Service" (Thesa) that has been selected. Additionally, in FIG. 3C areas 315 through 318 display four different Questers that take their data from a QuestObjects Thesaurus Service. These Questers all access the same Thesaurus and all have a dependency on the selected string in the main list of area 314. Once the user clicks on a string in area 314 the thesaurus lists 315 through 318 are automatically updated to show the corresponding "Used For terms" UF, "Broader Terms" BT, "Narrower Terms" NT, and "Related Terms" RT from the Thesaurus Service. Questers 315 through 318 thus have a different Qualifier that is used to access the same QuestObjects Service. It will be evident to those skilled in the art that this example is not intended to be a complete description of features that a thesaurus browser (or any other Service) provides. Most thesauri offer a multitude of term relationships and qualifiers. A Questlet or part of a Questlet may provide access to a multitude of QuestObjects Services. A possible way to do this is to show multiple tabbed panes accessible through tab buttons named after the Services they represent 320.

Data from the QuestObjects Services can be displayed by a Questlet in many forms. Thesaurus browser Questlets generally display interactive lists of related terms. Questlets can also allow users to lookup data in a reference database (dictionary, encyclopedia, product catalog, Yellow Pages, etc.) made available as a QuestObjects Service. Furthermore, Questlets can access QuestObjects Services that provide a standardized interface to search engines. These search engines may be Internet-based or can be built into existing database servers. Questlets can also access pre-defined functions made available as QuestObjects Services (such as a bank number check, credit card validation Service or encryption/decryption Service). Questlets can even access translation Services allowing on-the-fly translation of entry data. In some embodiments Questlets can retrieve multimedia data formats by receiving a URL or pointer to multi-media files or streaming media from a QuestObjects Service. In other embodiments Questlets can be used to display current stock quotes, news flashes, advertisements, Internet banners, or data from any other real-time data push Service. Questlets can provide an auto-complete or validity checking mechanism on the data present in specific fields or combinations of fields in relational database tables.

As described above, Questlets are well suited to represent QuestObjects data visually. However, a QuestObjects Client system can also contain non-visual Active Components, such as function calls from within a procedure in a program to access a QuestObjects Service. A program that needs to display a static or unchanging list of strings can use a Quester in its initialization procedure to retrieve that list from a QuestObjects Server. By calling a Quester, a stored procedure in a database can make a QuestObjects Service available to any database application. By encapsulating a Quester into an object supplied with a programming language, a QuestObjects Service can be made available to its developers. Another example of how QuestObjects Services may be accessed is through a popup menu that a user can access by clicking on a word, phrase or sentence in a document. The popup menu can include one or more QuestObjects Services by calling one or more Questers. In an application that is controlled by speech, a sound conversion engine that translates speech input into phonemes can be used to send these phonemes to a QuestObjects speech recognition Service through a Quester. As yet another example, a control system can use a Quester to send sensor readings to a Server, which then queries a special purpose content engine to return actions that the control system must perform given the sensor readings.

Figure 4:
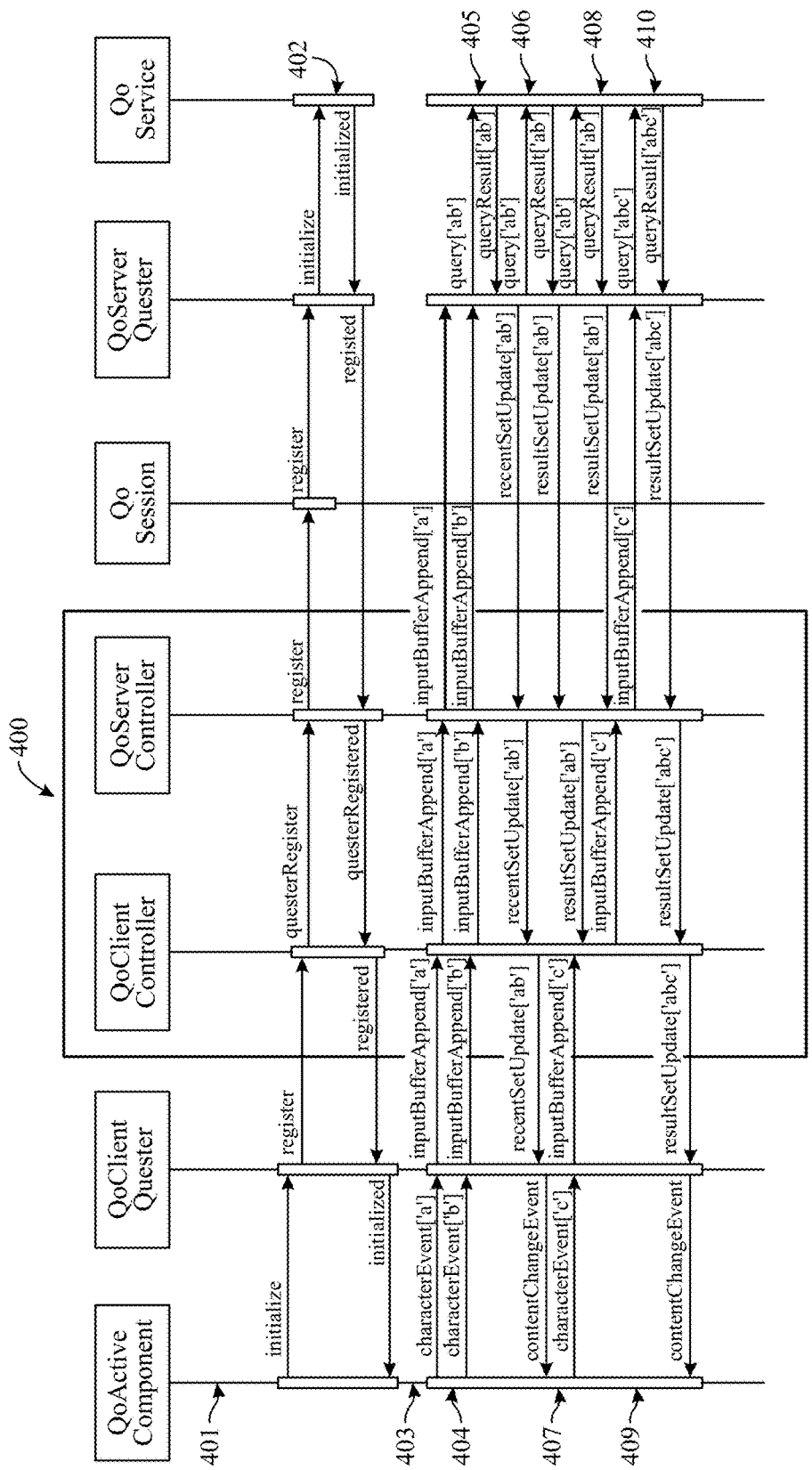
FIG. 4 shows a sequence diagram illustrating the use of a system in accordance with an embodiment of the invention.

FIG. 4 shows a simplified event life cycle illustrating what happens in a QuestObjects system using an auto-complete Service. The protocol of the present invention is implemented in the Client Controller and the Server Controller 400. In an initial phase an Active Component on the Client tells its Quester to start or initialize 401 a corresponding Client Session on the current QuestObjects Server by sending a Register message to its Client Controller. The Server Controller starts a Client Session if it has not been started already. For simplicity the event trace of FIG. 4 does not show typical error handling that normally occurs, for instance when a Session cannot be started. If the Quester was used before in the same Active Component and application, the Session may restore the Quester from a Persistent Quester Store, which may even cause a Query to be triggered immediately if the Result Set in the Quester is out of date.

The Server Quester looks up the Service in the Server's list of known QuestObjects Services, which may or may not be located on the same computer. Once the Service is found, the Client is registered and optionally authenticated by the Service. At this time, the Service 402 returns information to the Server Controller at which time the Client receives a confirmation that it was registered successfully. The Active Component can now start using the Quester it has just initialized. If the Active Component has a user interface (i.e. it is a Questlet) then it will now allow the user to start entering characters or cause other user events.

The next step in the process is to capture user input. As shown in FIG. 4, at point 403 a character event is generated to indicate the user has typed a character into the Questlet. The Quester sends a message to its Client Controller telling it that character must be appended to the input buffer (it will be evident to one skilled in the art that if the cursor is not at the end of the input string, typing would, for example, generate a different event to insert the character instead of append it). The Client Controller uses the protocol to synchronize the input buffer in the Server Quester by communicating to the Server Controller. The Server Controller may look up query in its Result Set cache, in which case it can return a previous Result Set to the Client without accessing the Service. Also, depending on any rules specified by the Service (as specified by a list of Query Patterns and Query Filters defined in the Query Manager of the Content Channel) and depending on the time interval between input buffer changes, the Server Quester may decide not to immediately send the (perhaps incomplete) string to the Service, as shown here.

An additional character event 404 is generated when the user has typed a second character 'b' into the Questlet. As before, a corresponding event arrives at the Server Quester. In this case, the Server Quester may deduct that the input string represents a valid query and send the appropriate query message 'ab' to the Service. After receiving a query, the Service executes it by accessing its Content Engine through the Content Access Module unless the Query Manager was able to lookup the same Query with a Result Set in the Content-based Cache. After an appropriate Result Set 405 is retrieved, the Service will return it to the Client. In some embodiments, a large Result Set may be returned to the Client in small batches. In other embodiments an incomplete Result Set may also be returned if the Content Engine takes a long time to come up with a batch of results. A QuestObjects Service may automatically 'push' updated information matching the previous query to the Client as it becomes available. A Query can also be set to auto-repeat itself 406 if necessary or desired.

At step 407 the user types a third character 'c' into the Questlet. While this character is being sent to the Server, a second and possibly third result set from the previous query is on its way to the Client. When the Client Controller decides 408 that the received Result Set 'ab' no longer matches the current input string 'abc', the second update of 'ab' is not transmitted to the Active Component. Depending on the sort order and sort attributes of the Result Set, the Client Controller may still send the second and third Result Sets to the Active Component if the second query 'abc' matches the first string of the Result Set for the first query 'ab' 409. In that case, the user typed a character that matched the third character in the second or third Result Set, thus validating the Result Sets for the second query. Eventually the Server Quester receives notice of the third character appended to the input buffer, and sends a new query 'abc' to the Service. The Server Quester will stop the 'repeating' of query 'A' and the Service will now execute 410 the new query 'abc' at the Content Engine, or retrieve it from the Content-based Cache.

Figure 5A:
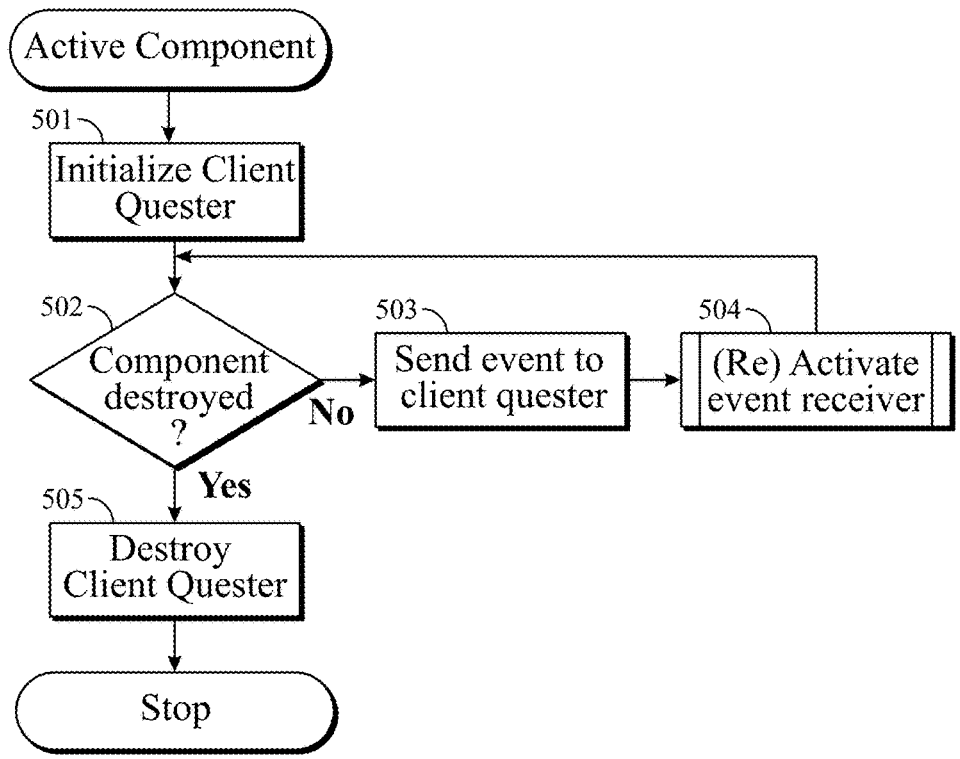
FIG. 5A shows a first thread flow chart illustrating the interface between an active component and an embodiment of the invention.
Figure 5B:
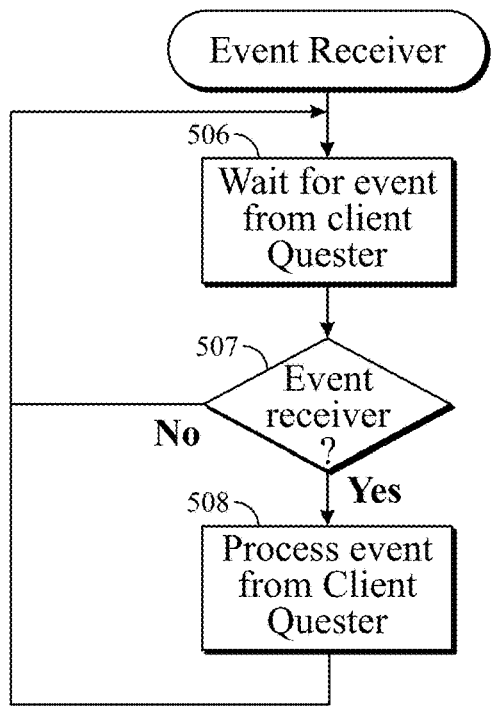
FIG. 5B shows a second thread flow chart illustrating the interface between an active component and an embodiment of the invention.

FIG. 5 depicts a flow chart illustrating the interface between an Active Component and the present invention. As shown therein a Client Quester is initialized (step 501) in which each active component is associated with one or more Client Questers. A loop is then entered that exits when the Active Component is destroyed (step 502). In the loop, events are sent to the Client Quester (step 503), such as keyboard events, click events and focus events (i.e. events that tell the system which user interface element currently has input focus). When events are sent to the Client Quester, they may result in return events from the Client Quester, such as events informing that the Result Set of the Client Quester has changed. Those events are received by the event receiver (step 504). The event receiver waits for events from the Client Quester (step 506) and—if events have been received (507)—processes them (step 508). It will be evident to one skilled in the art that the Active Component can be multi-threaded, in that the event receiver can work concurrently with the rest of the Active Component. The Active Component may also use a cooperative multithreading scheme where it actively handles client events and server responses in a continuous loop.

Figure 6A:
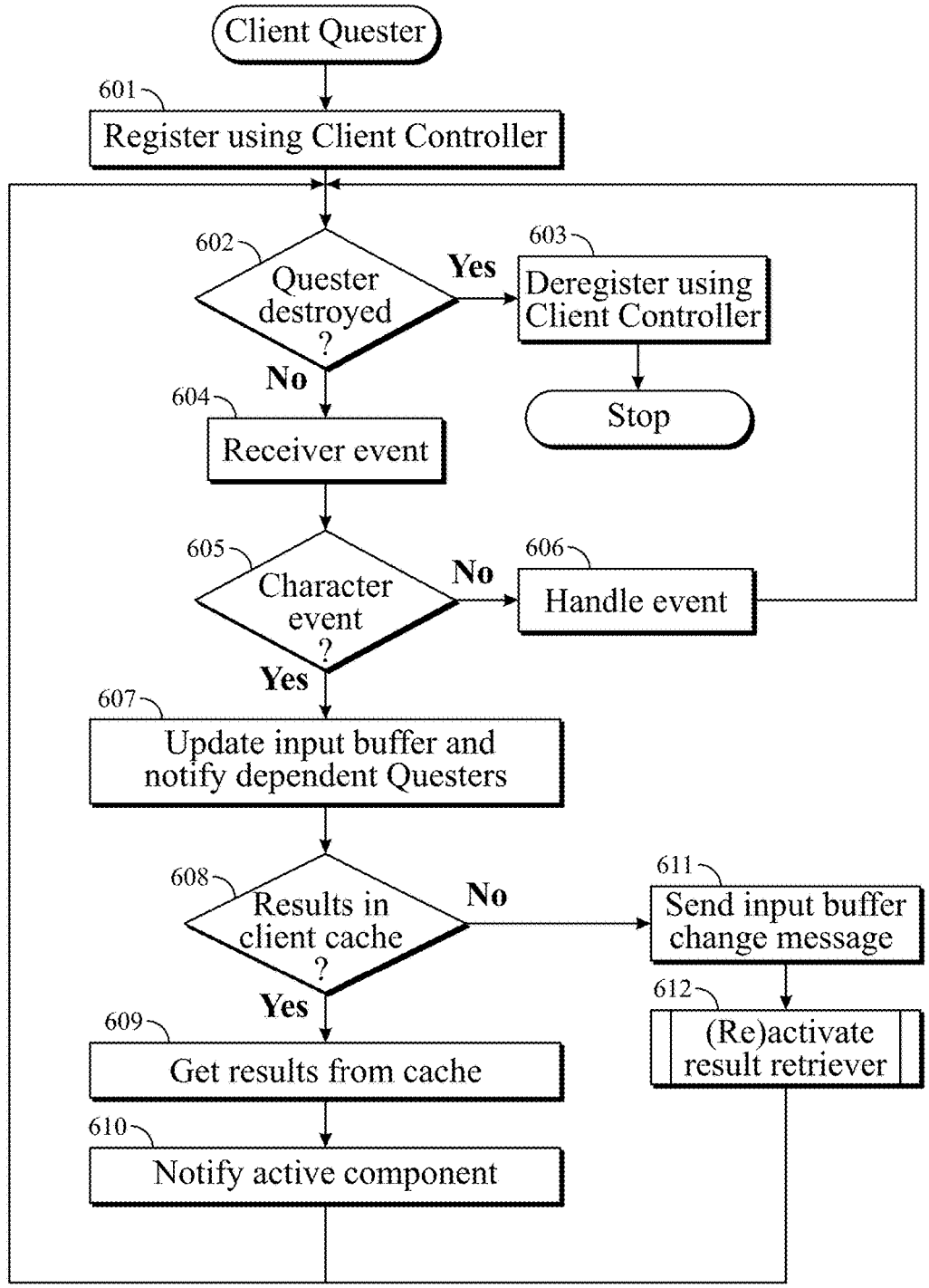
FIG. 6A shows a first thread flow chart illustrating the client side of an embodiment of the invention.
Figure 6B:
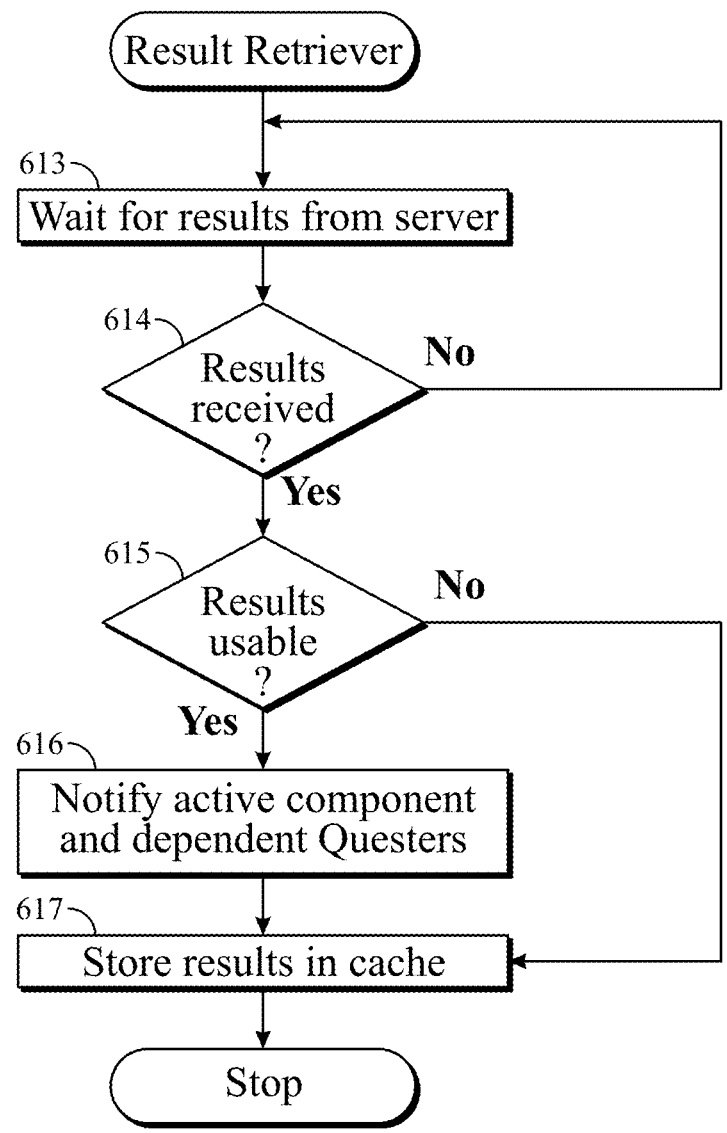
FIG. 6B shows a second thread flow chart illustrating the client side of an embodiment of the invention.

FIG. 6 shows a flow chart illustrating the Client side of the present invention. First, the Client Quester registers itself with the Client Controller (step 601). It then enters a loop that exits when the Client Quester is destroyed (step 602). When that happens, the Client Quester deregisters itself from the Client Controller (step 603). During the loop the Client Quester handles events from the Active Component it belongs to. First, it waits for an event and receives it (step 604). Then the type of the event is checked (step 605). If it is not a character event, it is handled depending on the type and content of the event (step 606). An example of a non-character event is a double-click on the input string, the click of a button that clears the input buffer, the addition of characters to the input buffer by a paste-action etc. If the event is a character event, the input buffer is updated accordingly and Client Questers that have dependencies with the input buffer or the Result Set also are notified (step 607).

The next step is to get results based on the new input buffer. First, the Client Quester checks if the results are present in the client-side cache, which usually is a fast short-term in-memory buffer (step 608); if so, they are retrieved from the cache (step 609) and the Active Component is notified of the results (step 610). If the results are not found in the cache, the Client Quester uses the Client Controller to send the new input buffer to the Server Quester, so that a new query can be executed (step 611). To support this, the protocol of the present invention provides a number of messages that allow the Client Quester to send just the changes to the input buffer, instead of sending the entire input buffer. These messages include but are not limited to: inputBufferAppend, inputBufferDeleteCharAt, inputBufferInsertCharAt, inputBufferSetCharAt, inputBufferSetLength, and inputBufferDelete. After thus updating the Server Quester's input buffer, the Client Quester activates the result retriever to wait for new results and process them (step 612).

The Client Quester is intended to be multi-threaded, so that it can continue providing its services to its Active Component while it waits for results from the QuestObjects Server. Therefore, the Result Retriever can be implemented to run in a separate thread of execution. In this embodiment the Result Retriever waits for results from the Server Quester (step 613). If results have been received (step 614), it checks whether they are usable (step 615). Results are usable if they correspond to the latest query. If results are from a previous query (which can occur because the system is multi-threaded and multi-tier), they may also still be usable if the Client Quester can filter them to match the new input buffer (this depends on the sort flags in the Result Set). If results are usable, the Active Component is notified of the new results. This notification is also sent to other Client Questers that have dependencies on the originating Client Quester (step 616). Received results are stored in the client-side cache, regardless of whether they were found to be usable (step 617).

Figure 7A:
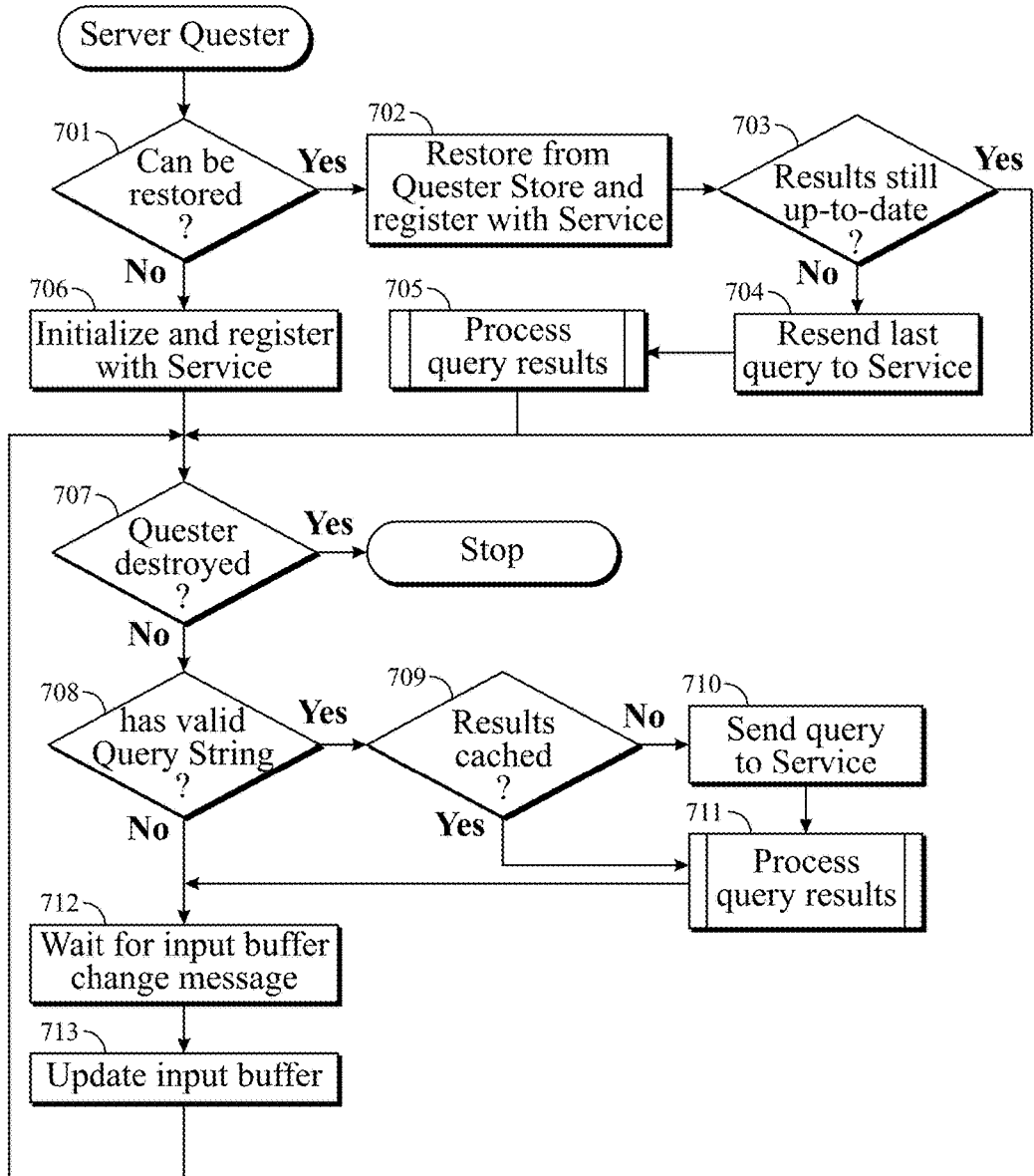
FIG. 7A shows a first thread flow chart illustrating the server side of an embodiment of the invention.
Figure 7B:
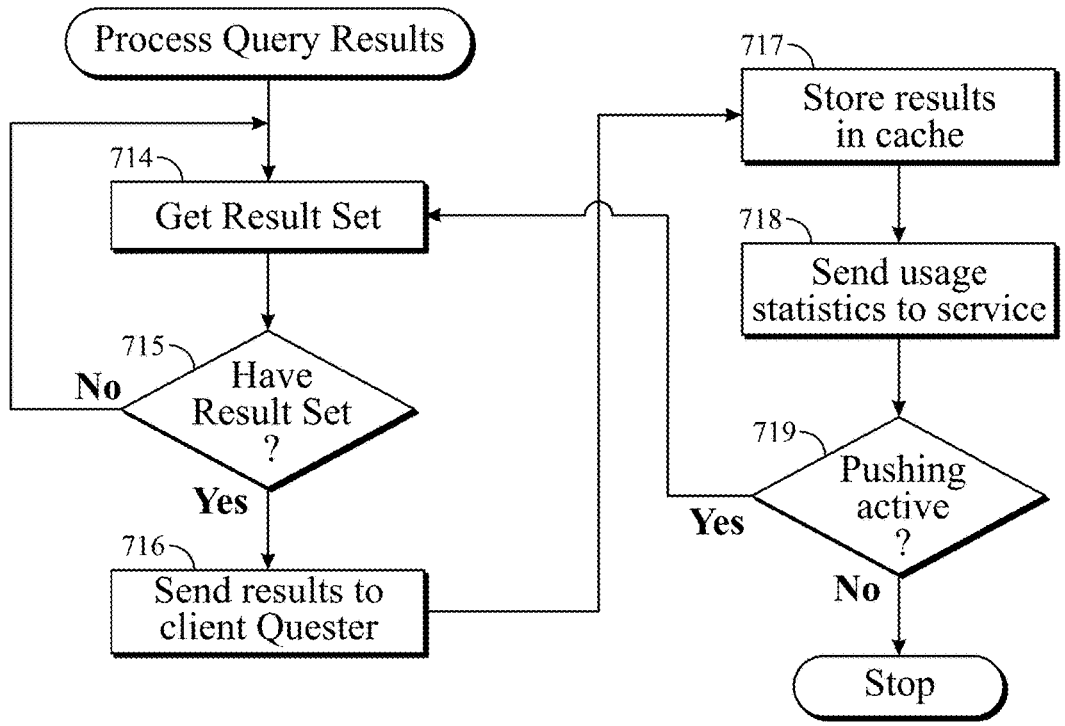
FIG. 7B shows a second thread flow chart illustrating the server side of an embodiment of the invention.

FIG. 7 is a flow chart illustrating the Server side of the present invention. The first thing a Server Quester does when it is created, is to check whether its attributes can be restored from the Persistent Quester Store (step 701), based on the parameters with which it is created. If the attributes can be restored, they are restored and registered with its corresponding Service (step 702). In accordance with one embodiment, one of the restored attributes is a Result Set attribute; the Server Quester checks whether it is still up to date (step 703). If not, a query is sent to the corresponding Service if it is a pushing service or if the Query was originally set to be auto-repeating (step 704) and (in a separate thread of execution) the Server Quester waits for the results of that query and processes them (step 705).

If the Server Quester's attributes could not be restored, it initializes itself and registers itself with the correct service which is one of the initialization parameters (step 706). If the Client Quester was created with a default input buffer, the Server Quester may automatically send the corresponding Query to the Service. At this point, the initialization process is complete and the Server Quester enters a loop that exits when the Quester is destroyed (step 707). During the loop, the Server Quester checks whether the Query String is valid, using the validation attributes of the Service (Query Pattern and Query Filter) (step 708). If the query is valid, the Server Quester checks if the server-side cache has the results for the Query String (step 709). If not, a new Query is sent to the Service (step 710). After that, the results are retrieved (either from cache or from the Service) and processed (step 711).

After validating (and possibly processing) the Query String, the Server Quester waits for messages from the Client Quester notifying of changes to the input buffer (step 712). If such a message is received, the input buffer is updated accordingly (step 713), and the loop is re-entered (step 708).

The processing of query results is performed in a separate thread of execution. The process performed in this thread starts by obtaining the Result Set (step 714), either from the server-side cache or from the Service depending on the result of the decision in step 709. When these results are obtained (step 715), they are sent to the Client Quester (step 716) either as part of the Result Set or as the entire Result Set, depending on parameters set by the Client Quester and are stored in the server-side cache (step 717). In addition, the Service is notified of actual results that have been sent to the client (step 718). If the results were pushed by the Service (step 719), this thread starts waiting for new results to be processed; otherwise, the thread stops.

Figure 8B:
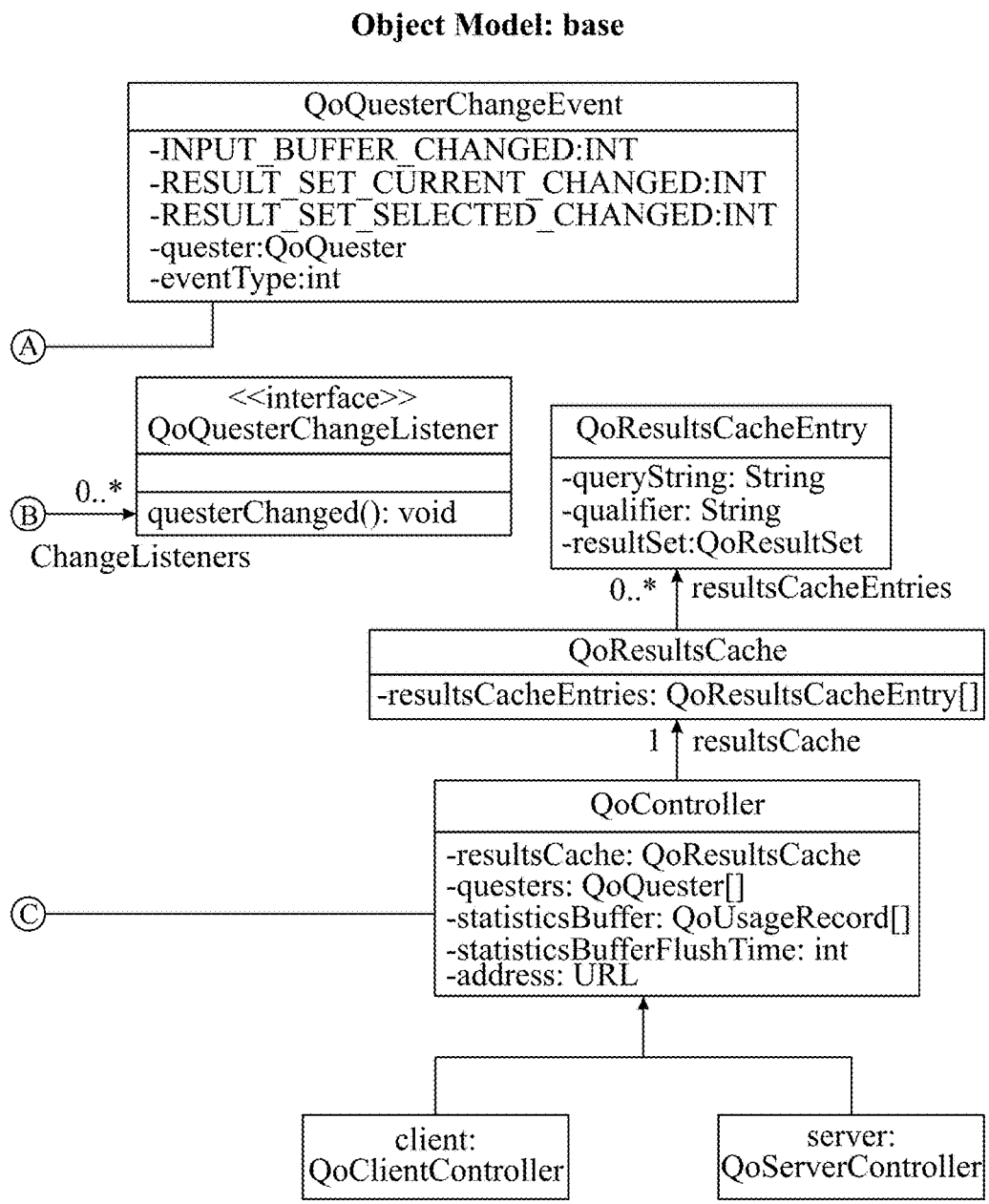
Figure 8C:
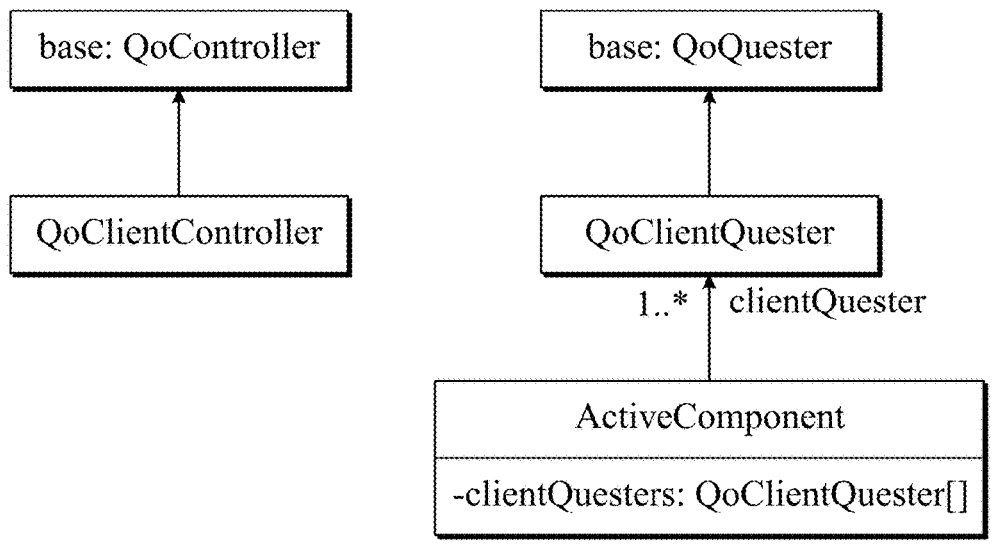
FIG. 8C shows an object model of an embodiment of the present invention, displaying the client part.
Figure 8D:
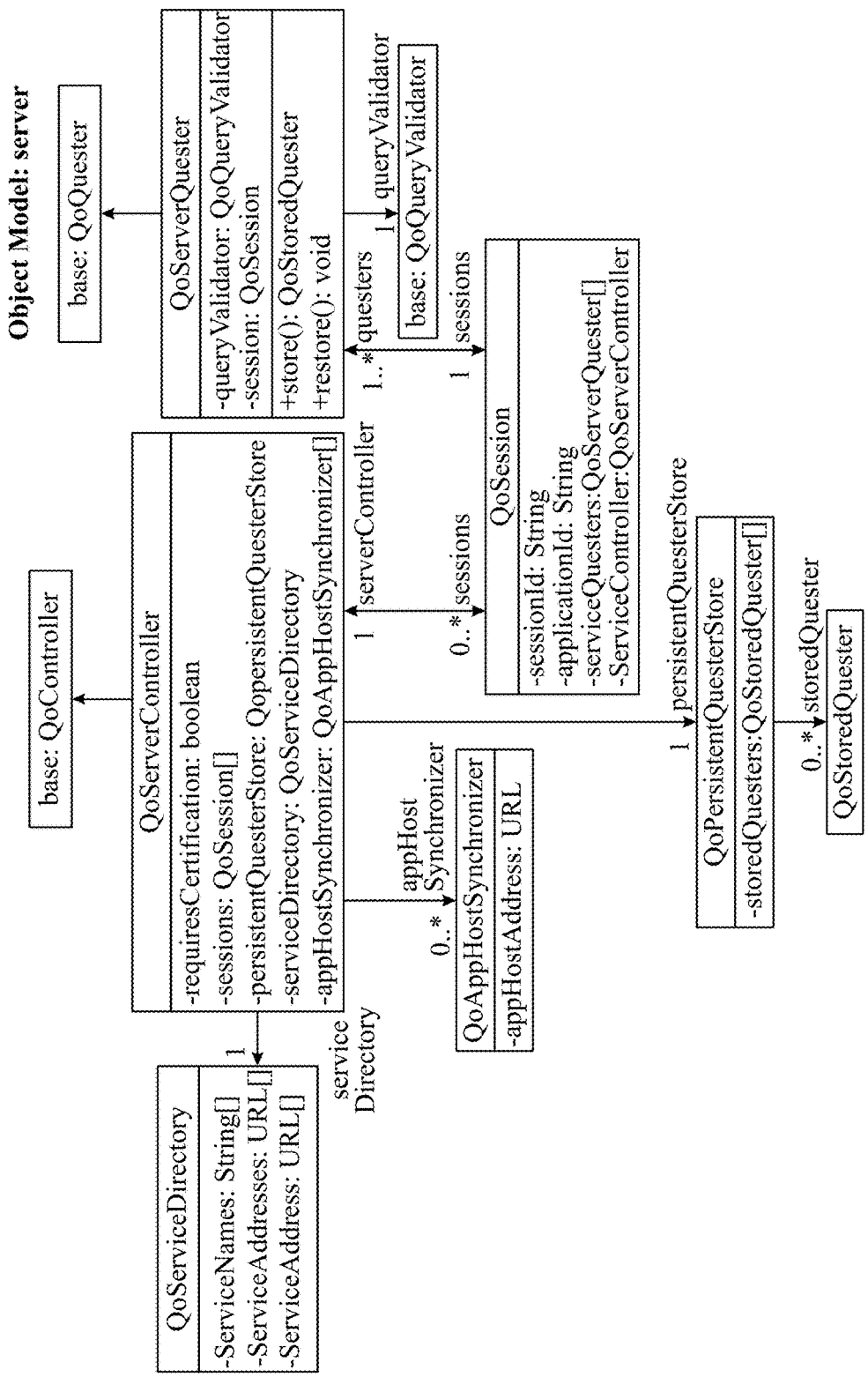
FIG. 8D shows an object model of an embodiment of the present invention, displaying the server part.
Figure 8F:
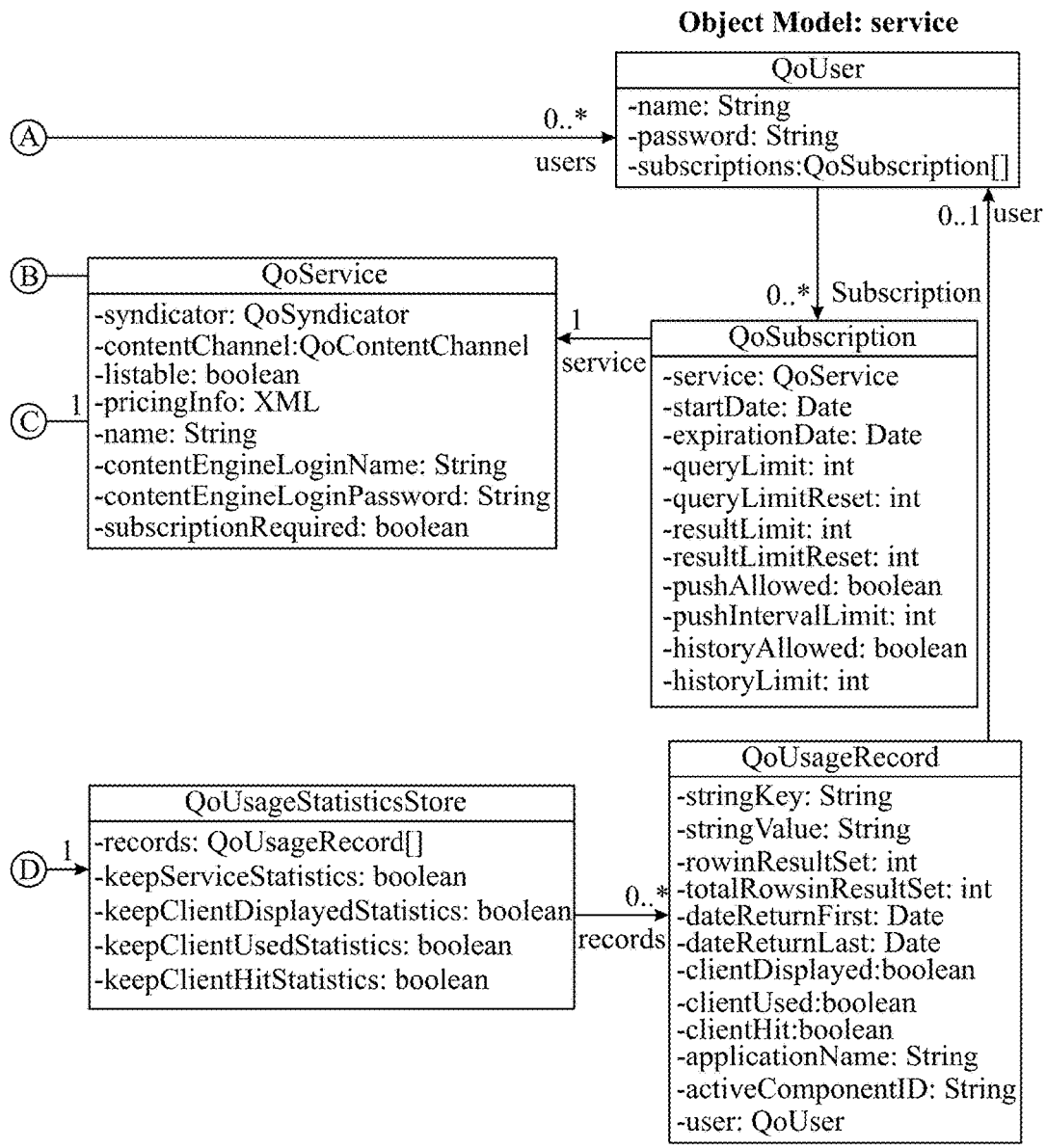

FIGS. 8A-8F illustrates and object model of an embodiment of the present invention. FIG. 8A-8B illustrates the base portion of the model containing the entities that are not specific to either QuestObjects Clients, QuestObjects Servers, or QuestObjects Services. FIG. 8C displays the entities that are specific to the QuestObjects client. FIG. 8D contains the entities specific to the QuestObjects Server. FIG. 8E-8F shows the entities specific to the QuestObjects Service.

Each of FIGS. 8A through 8F shows object models of one particular embodiment of the present invention, using UML (Unified Modeling Language) notation. Note that in the figures some of the entities have a name that starts with one of the words 'base', 'client', 'server', and 'service', followed by two colons. Those entities are merely references to entities in the subfigure indicated by the word before the two colons. For example, the entity named 'service::QoService' in FIG. 8A-8B is a reference to the 'QoService' entity in the figure of the service part, namely FIG. 8E-8F. It will be evident to one skilled in the art that the model shown is purely an illustrative example of one embodiment of the invention and that other models and implementations may be developed to practice the invention while remaining within the spirit and scope of the this disclosure.

The base part of the system—depicted in FIG. 8A-8B—comprises entities that are not specific to one of the tiers of the QuestObjects system. One of the most important entities shown in FIG. 8A-8B is QoString, the QuestObjects String. QoString models the strings that the QuestObjects System handles. A QoString has at least a value, which is the sequence of (Unicode) characters itself. To guarantee a minimum performance level, i.e. one in which the communication takes as little time as possible, this value has a limited length (e.g. of 256 characters). Furthermore, a QoString may have a key and metadata. The key (if any is present) is the identifier (i.e. the primary key) of the QuestObjects String in the database from which it originates. This key can be used to retrieve data from the database that is related to the QuestObjects String. Metadata of a QoString can be any additional data that is provided with the QoString's value. Metadata of a QoString is XML formatted and has a limited length (e.g. 2048 bytes), in order to ensure that QoStrings can be exchanged between the tiers of the QuestObjects System without compromising efficiency. If the QoString originates from a Content Channel, it may also have a fetchTime, namely the timestamp of when the QoString was retrieved from the underlying content provider. It also may have an expirationTime indicating how long the data in the QoString is to be considered valid. Optionally a QoString can have a type, which is a reference to a QoType object. (Note that for maximum efficiency the types are not actually stored in the QoStrings, because it is very likely that many QoStrings in a QoResultSet have the same type. Storing the types in the strings would unnecessarily increase network traffic.)

The QoType object models the concept of a string's type. It has a string typeString that contains the description of the type and an indicator typeIndicator that defines the meaning of the description (typeString). Examples of string types are: the DTD or Schema of the string's value in these cases in which it is XML formatted (or, alternatively, the URL of the DTD or Schema), the number formatter in the case it is a number, and the date (and/or time) formatter in the case it is a date (and/or time). Table 1 shows an example of the use of types, especially type indicators.

| Value of typeIndicator | Meaning of typeString |
|---|---|
| 0 | typeString contains the name of the type |
| 64 | typeString contains a string formatter |

| Value of typeIndicator | Meaning of typeString |
| --- | --- |
| 65 | typeString contains a number formatter |
| 66 | typeString contains a date formatter |
| 128 | typeString contains a DTD |
| 129 | typeString contains a Schema |
| 160 | typeString contains the URL of a DTD |

In the example shown in Table 1, bit 7 of the typeIndicator is on if typeString is XML related, bit 6 is on if typeString is some formatter, and bit 5 is on when typeString is a URL. This name must follow the same naming scheme as Java packages: They must use the Internet domain name of the one who defined the type, with its elements reversed. For example, custom types defined by MasterObjects would begin with 'com.masterobjects'.

The QoQuery entity models the specification of a QuestObjects Query. It includes a queryString that contains the value the Content Channel is queried for (which is named queryString in the figure). In addition to the queryString, QoQuery has a property 'qualifier' that can hold any other attributes of the query. The format and meaning of the qualifier's contents is defined by the Content Channel that executes the query. Furthermore, it can be specified which row numbers of the total result set must be returned using the property 'rownums'. The property 'requestedTypes' can optionally hold a list of QoTypes, limiting the types of the strings that will result from the query. The 'timeout' property can be used to specify a maximum amount of time execution of the query may take.

Queries may include a type (QoQuerytype). Query types are similar to QoType (i.e. String Types), and can be used by QuestObjects Clients to find all QuestObjects Services that support a certain kind of Query.

The result of a query is represented by the QoResultSet entity. QuestObjects Result Sets are collections of QuestObjects Strings that are sent from a QuestObjects Server to a QuestObjects Client in response to a query. QoResultSets are created and filled by a QuestObjects Service (to which QoResultSet has a reference named 'service'), based on the QoQuery to which the QoResultSet has a reference. Actual results are stored as an array of QoStrings in the 'strings' property. Elements of the QuestObjects Result Set (i.e. QoStrings) may be selected, as indicated by the 'selected' property that is a list of indices in the strings array of selected strings. Also, one of the QoStrings may be marked as current as indicated by the 'current' property. (When a QoString is marked as current it means that all operations are performed on that QoString, unless another one is explicitly specified.) QuestObjects Result Sets include an attribute 'ordered' that indicates whether the QoStrings in the QoResultSet are ordered. Sometimes, especially when a QuestObjects Result Set is narrowed down by a new Query, the fact that the QoResultSet is ordered may mean that the QuestObjects Client does not need to actually execute a new Query; instead, it can filter the previous QuestObjects Result Set itself according to the new queryString.

As further described below, Server Questers may have a QuestObjects Result Set, of which only a part is sent to the QuestObjects Client. At all times, the 'rownums' property of QoResultSet indicates the row numbers of QoStrings that are actually present in the QoResultSet. The rownums property may have different values for corresponding QoResultSets on the QuestObjects Server and the QuestObjects Client. The same holds for the 'strings' property. The 'complete' property is the percentage of the QoStrings in the server-side QoResultSet that is present in the corresponding client-side QoResultSet as well. The property 'totalNumberOfStrings' indicates the total number of QoStrings in the QoResultSet, whether actually present or not. For server-side QoResultSets this number is always equal to the length of the 'strings' array, but for client-side QoResultSets the number may be smaller.

Finally, result sets include an identifier 'resultSetId'. Every time a Client Quester uses the protocol of the present invention to send something to the Server Quester that may result in a new QuestObjects Result Set, it includes a request identifier. This identifier is then copied in the resultSetId when the QuestObjects Result Set is sent to the Client Quester. In this way Client Questers know which request the QuestObjects Result Set belongs to. (This is important because the system is asynchronous and on occasions it may occur that a newer QuestObjects Result Set is sent to the client before an older one. The request identifier and QuestObjects Result Set identifier allow the Client Quester to detect and handle this.)

The core entity in the figure is QoQuester. QoQuester is the superclass of both QoClientQuester (part of the client and thus depicted in FIG. 8C) and QoServerQuester (depicted in FIG. 8D). The QoQuester entity models the Quester concept. Its primary task is to maintain an input buffer, to make sure that QuestObjects Queries are executed and to store and provide access to the QuestObjects Result Sets returned by QuestObjects Services in reply to QuestObjects Queries. At all times, a QoQuester holds one QoResultSet that contains the results of the latest QuestObjects Query. (Note that a QoQuester may hold other QoResultsSets as well, for example for optimization purposes.) Client Questers and Server Questers exist in a one-to-one relationship with each other: for every Client Quester there is exactly one corresponding Server Quester, and vice versa. All properties listed in QoQuester are present and equal, both in the Client Quester and in the corresponding Server Quester. An important exception is the resultSet property. In the Server Quester, this is always the entire QuestObjects Result Set of the latest Query. However, in order to minimize network traffic the Server Quester is intelligent about the portion it actually sends to the Client Quester. Questers include a property 'minimumBatchTime' that indicates the minimum amount of time that should pass before the Server Quester sends results to the Client Quester. This allows the Server Quester to accumulate results and send them as a single action instead of as a separate action for each result. There are two situations in which the Server Quester may ignore this minimum batch time:

(a) when the result set is complete before the minimum batch time has passed, and (b) when the number of accumulated results exceeds the number indicated by the 'resultSetBatchSize' property before the minimum batch time has passed.

If, for whatever reason, the Server Quester postpones sending the accumulated results to the Client Quester, the (optional) 'maximumBatchTime' property indicates how long it may postpone the sending. Even if no results are available yet, when the maximumBatchTime passes, the Server Quester must notify the Client Quester thereof.

Results are sent to the Client Quester in batches, the size of which is indicated by the 'resultSetBatchSize' property. Occasionally, the Server Quester may deviate from this batch size, notably when the number of results that is not present on the client is smaller than the batch size or when the maximumBatchTime has passed. This concept can be taken even further, for example when the batch size is 10 results and the Server Quester has 11 results, the Server Quester may send them all, even though it exceeds the batch size, because sending one extra result with the other 10 is probably more efficient than sending a single result in a separate batch at a later point. The Server Quester can use the 'clientMaximumLatency' to make such decisions; it indicates the maximum expected amount of time that elapses between sending a message and receiving its response. The higher this value, the more likely it is that sending the eleventh result with the other ten is more efficient.

Questers include an input buffer. The content of the input buffer is what the QuestObjects Service will be queried for. In the Client Quester, the input buffer is controlled by the application that uses the QuestObjects system. For example, an application with a graphical user interface may update the input buffer according to key presses in one of its input fields. The Client Quester keeps the input buffer of its corresponding Server Quester up to date using the protocol of the present invention.

Properties 'highestReceivedResultSetId' and 'latestRequestId' are used to detect when QuestObjects Result Sets are received out of order. As with the 'resultSetId' property of the QoResultSet, every QuestObjects Result Set includes an identifier. The 'highestReceivedResultSetId' property stores the highest of all received QuestObjects Result Set identifiers. If a Client Quester only needs the latest results, it can simply discard received QuestObjects Result Sets that have a lower identifier than 'highestReceivedResultSetId'. The 'latestRequestId' is the identifier of the latest request. The QuestObjects Result Set with an identifier that matches 'latestRequestId' holds the results of the latest request.

The remaining properties of QoQuester store the QuestObjects Service the Quester uses (service), the optional qualifier that Queries to this QuestObjects Service need (qualifier), the types the Quester can handle (types), whether an application proxy is needed, and the optional function of the Quester in the application ('applicationFunction', used by the application proxy mechanism to determine how the value of the Quester is to be passed to the application/web server). In addition, if the update interval property 'autoUpdateInterval' is set to a non-zero value, the Server Quester will automatically repeat the last Query with that interval. This is useful for QuestObjects Services that are not capable of pushing results themselves. A mechanism is required to allow any other entity to be notified of changes in the Quester. There are many ways this can be done. As an example in the embodiment shown in FIGS. 8A-8D an event mechanism is included that involves event listeners and event handlers, very similar to the Java2 event mechanism. An entity that wants to be notified of changes must implement the QoQuesterChangeListener interface and then be added to the Quester's 'changeListeners' property (using the method 'addQuesterChangeListener'). When the Quester changes, it will call the 'questerChanged' method of all registered QoQuesterChangeListeners with a QoQuesterChangeEvent as a parameter. The QoQuesterChangeEvent holds a description of the changes of the Quester; it has a reference to the Quester that raised the event and an event type. In FIG. 8 three event types are displayed (INPUT BUFFER CHANGED indicates that the Quester's input buffer has changed, RESULT SET CURRENT CHANGED indicates that the current item of the Quester's Result Set has changed, and RESULT SET SELECTED CHANGED indicates that the list of selected results in the Quester's Result Set has changed). More event types can be added as desired.

Another important entity in FIG. 8A-8B is QoController. QoController is the entity that implements the protocol of the present invention. In addition, it knows how to buffer usage statistics and also handles the caching of result sets. QoController includes two subclasses (QoClientController and QoServerController), depicted in FIG. 8*b* and FIG. 8*c*, respectively. Buffering of usage statistics is an optimization that eliminates the need of exchanging usage data between the layers of the system every time a result is used. Instead, the QuestObjects Controller buffers that data and flushes the buffer when the statisticsBufferFlushTime has passed. Caching is an optimization as well. Caching is done by the QoResultsCache entry, to which the QuestObjects Controller has a reference. The QoResultsCache has a list of cached entries ('resultsCacheEntries'). The entry of the cache is modeled as QoResultsCacheEntry, an entity that has a list of QuestObjects Result Sets for combinations of query strings and qualifiers (as defined in QoQuery).

The last entity in FIG. 8A-8B is QoQueryValidator. QoQueryValidator is an abstract class that defines the method 'is Valid'. This method has a query string as a parameter and returns either 'true' or 'false'. QuestObjects Services may declare and publish a QoQueryValidator. By doing so, they allow the QuestObjects Server to verify the validity of a query string without actually having to send it to the QuestObjects Service, thus eliminating network traffic for invalid query strings.

FIG. 8C displays the minimal entities every QuestObjects Client must have. Every client of the QuestObjects System at least has a Client Controller QoClientController. QoClientController is a subclass of QoController that implements the client side of the protocol of the invention. Applications using the QuestObjects System do so through Client Questers, modeled as QoClientQuester. QoClientQuester is the subclass of QoQuester that implements client-specific Quester functionality. The figure contains the entity 'ActiveComponent'. It represents some entity that uses the QuestObjects System through one or more Client Questers.

FIG. 8D shows the server part of the embodiment of the present invention, and includes the QoServerQontroller, one of the subclasses of QoController. QoServerController implements the server-side part of the protocol of the present invention. In addition, it maintains a list of sessions running on the server, and it has references to a Persistent Quester Store, an optional Service Directory and a list of optional Application Host Synchronizers. For security reasons, one implementation of the QuestObjects System may require that only certified clients can connect to the system. A boolean 'requiresCertification' indicates this.

The QuestObjects System is session-based. This means that clients that use the system are assigned to a session, modeled by the QoSession entity. Every session has a unique identifier, the 'sessionId'. The QoSession entity maintains a list of Server Questers that are active in the session (stored in the 'serverQuesters' property). Furthermore, it has a reference to the Server Controller through which a QuestObjects Client is using the session.

QoServerQuester is the server-side subclass of QoQuester. It includes a reference to the session it is being used in (the 'session' property). Furthermore, when the QuestObjects Service that the Quester uses has a Query Validator, QoServerQuester has (a reference to) a copy of that Query Validator, so that query strings can be validated before they are actually sent to the QuestObjects Service.

The QoPersistentQuesterStore is an entity that is able to store a user's session and to restore it at some other time, even when the session would normally have expired or even when the same user is connecting from a different client machine. To this end, QoServerQuester has two methods 'store' and 'restore'. The first, 'store', returns a QoStoredQuester, which is a (persistent) placeholder of the Server Quester that contains all relevant data of that Server Quester. The second, 'restore', needs a QoStoredQuester as an argument. The two are each other's inverse, which means calling 'store' on a QoServerQuester and then calling 'restore' on the result creates a new QoServerQuester that is an exact copy of the original QoServerQuester.

QoServiceDirectory acts as a Yellow Pages or directory of QuestObjects Services. For each QuestObjects Service it stores the name and address, as well as the address of the QuestObjects Server through which the Service can be accessed. Furthermore, Services' profiles are additionally stored to allow clients to find all QuestObjects Services satisfying desired criteria.

Finally, QoAppHostSynchronizer is the AppHost Synchronizer. QoAppHostSynchronizer has its address as a property ('appHostAddress').

FIG. 8E-8F depicts the service part of the embodiment of the present invention. Content is disclosed through Content Channels (the QoContentChannel entity). Content Channels use Content Access Modules (QoContentAccessModule) to obtain their data in a standardized way, so only the Content Access Module knows how to communicate with the underlying data source. Content Channels are organized in Syndicators (the QoSyndicator entity), and each syndicator includes a list of Content Channels. Each Quester in the QuestObjects System uses a specific Content Channel of a specific Syndicator. This is called a QuestObjects Service, namely one of the Content Channels of a Syndicator. The property 'subscriptionRequired' indicates whether the user needs to be a registered user to be allowed to use the Service. If it is false, only users listed in 'users' may use the Service. Users can be subscribed to QuestObjects Services, which is modeled by the QoSubscription entity. Statistics are kept per Content Channel using the QoUsageStatisticsStore entity. Content Engines optionally have a Query Validator that the QuestObjects Server may use to validate Query Strings before sending them off to the QuestObjects Service. In addition, Content Channels have a profile that consists of a Content Channel's description, a list of types (QoType) of QuestObjects Strings the Content Channel can provide, an optional list of DTDs of that metadata of QuestObjects Strings from the Channel conforms to, and an optional list of Query Types the Content Channel accepts.

QuestObjects Servers communicate with QuestObjects Services through the QoServiceSession. The QoServiceSession has a static reference to the QuestObjects Service it belongs to, as well as a static array of IP addresses of QuestObjects Servers that are allowed to connect to the QuestObjects Service. In some versions of the QoServiceSession the array of IP addresses can be replaced by a list of addresses and netmasks, or by IP address ranges. Every instance of QoServiceSession has the IP address of the server that is using the session (serverAddress), a connectionTimeout indicating the maximum period of idle time before the Service Session is automatically ended, and a serviceSessionId that can be used to refer to the Service Session.

As described above, a QuestObjects Service is one of the Content Channels of a Syndicator, so QoService has a reference to both ('syndicator' and 'contentChanner'). The property 'listable' indicates whether the Service may be listed in a Service Directory (server::QoServiceDirectory). If not, the Service can only be used if the application writer (i.e. the programmer using the QuestObjects to develop an application) knows that it exists and where it is available. The property 'name' is the Service's name, used in the Service Directory amongst others. This name must use the same naming scheme as the names of custom types. The boolean 'subscriptionRequired' indicates whether users must be subscribed (modeled by QoSubscription) to the Service in order to be allowed to use it. If the Content Engine of this Service's Content Channel requires login, 'contentEngineLoginName' and 'contentEngineLoginPassword' are the name and password with which is logged in. Finally, 'pricingInfo' contains information about the costs involved in using the Service. It is formatted as XML, conforming to a well-defined structure (i.e. DTD or Schema).

A Content Channel has a name (the 'name' property) and a profile (QoContentChannelProfile). The profile provides information about the Content Channel, namely about the Query Types it accepts ('queryTypes'), the types of the Strings it can provide ('types'), and the DTDs that QuestObjects Strings' metadata conforms to. In addition, it has a textual 'description' of the content the Content Channel discloses.

Content Channels also have properties that define the criteria Query Strings have to satisfy. The property 'queryStringMinLength' defined the minimum length a valid query has. Alternatively or additionally, 'queryStringRegularExpressions' may contain a list of regular expression describing valid Query Strings (meaning that Query Strings have to match at least one of the regular expressions). The property 'queryStringFilters' may hold a list of regular expressions and replacement strings that can transform Query Strings in a well-defined manner (for example the way the standard UNIX utility 'sed' does it). Instead of using these three properties, Content Channels may define a QoQueryValidator (described above in FIG. 8A). If there is a Query Validator, 'queryStringMinLength', 'queryStringRegularExpressions', and 'queryStringFilters' are ignored.

As described above, Syndicators may have a list of users. Users (QoUser) have a name and a password, as well as a list of subscriptions (QoSubscription). QoSubscription models a user's subscription to a Service (the 'service' property). The properties 'startDate' and 'expirationDate' define the time frame during which the subscription is valid. Outside that time frame the user will be denied access through the subscription. The maximum number of queries the user may run in the Service is stored in the 'queryLimit' attribute. The 'queryLimitReset' defines when the query counter is reset. For example, if queryLimit is 10 and queryLimitReset is 7 days, the user may run 10 queries per week. (If queryLimit equals zero the number of queries is unlimited and queryLimitReset is ignored.) The property 'resultLimit' stores the maximum number of results the user may receive from the subscription. Similar to 'queryLimitReset', 'resultLimitReset' defines how often the result counter is reset. If 'resultLimit' equals zero the number of results is unlimited and 'resultLimitReset' is ignored. The property 'pushAllowed' indicates whether the user may use the Service in pushing mode. If so, 'pushIntervalLimit' indicates the minimum amount of time that has to pass between two pushes. A 'historyAllowed' variable indicates whether a history is kept of the use of the subscription; if so, 'historyLimit' indicates the maximum size of the history. If the maximum size is exceeded, the oldest history data is deleted so that the size of the history is below the maximum size again. If 'historyLimit' equals zero, the size of the history is unlimited. Finally, a 'usageAnonymous' variable indicates that the QoUsageRecords that are generated for this subscription must not contain user information (this is necessary because of privacy issues).

If 'keepServiceStatistics' is true, then the QoUsageStatisticsStore can store three kinds of statistics:

statistics about Strings that have been displayed on the client; the 'keepClientDisplayedStatistics' indicates whether this kind of statistics are kept.

statistics about Strings that have actually been selected on the client; the 'keepClientSelectedStatistics' indicates whether this kind of statistics are kept.

statistics about Strings that have a used on the client; the 'keepClientUsedStatistics' indicates whether this kind of statistics are kept.

The Client Quester determines the exact meaning of the three kinds of statistics. In the case of web applications, a string is generally considered displayed when the Client Quester accesses it in its QuestObjects Result Set. It is considered selected when a new Query is executed with the String as Query String. It is considered used when the form on which the Client Quester is active is submitted with that String. The actual data is stored as a list of QoUsageRecords in the property 'records'.

A QoUsageRecord holds usage information about a QuestObjects String or a number of QuestObjects Strings. If, in one Service Session, a Quester gets the same Result Set more than once (consecutively), the usage data of each of the Strings in the Result Set is grouped in one QoUsageRecord. However, if 'stringKey', 'stringValue', 'rowInResultSet', or 'totalRowsInResultSet' changes, a new QoUsageRecord must be used from that point on. The properties of QoUsageRecord mean the following:

stringKey: if available, this is the unique key of the QuestObjects String as provided by the Content AccessModule.

stringValue: the value of the QuestObjects String.

rowInResultSet: the row of the QuestObjects String in its QuestObjects Result Set.

totalRowsInResultSet: the number of rows the QuestObjects String's Result Set had.

dateReturnFirst: the timestamp of the first time the QuestObjects String was returned by the Content Channel.

dateReturnLast: if the QoUsageRecord represents a group of usage events, this is the timestamp of the last event.

clientDisplayed: indicates whether the QuestObjects Client that received the QuestObjects String considers it to be displayed.

clientSelected: indicates whether the QuestObjects Client that received the QuestObjects String considers it to be selected.

clientUsed: indicates whether the QuestObjects Client that received the QuestObjects String considers it to be used.

applicationName: the name of the application to which the Quester that received the QuestObjects String belongs.

appliationFunction: the function (if available) of the Quester that received the QuestObjects String.

activeComponentId: the identifier of the Active Component that received the QuestObjects String.

user: the identifier of the user that saw/selected/used the String. If the user's subscription has 'false' as value of 'usageAnonymous', then this property is empty.

Queries are executed by QoQueryExecutors. A Query Executor has a reference to the Service Session in which the Query is executed, it has a reference to the Query itself, and it also has a reference to the Server Quester that has the Query executed. This reference may be a remote object when Corba is being used, for example. If some proprietary protocol is used, it may just be the unique identifier of the Server Quester.

Figure 9:
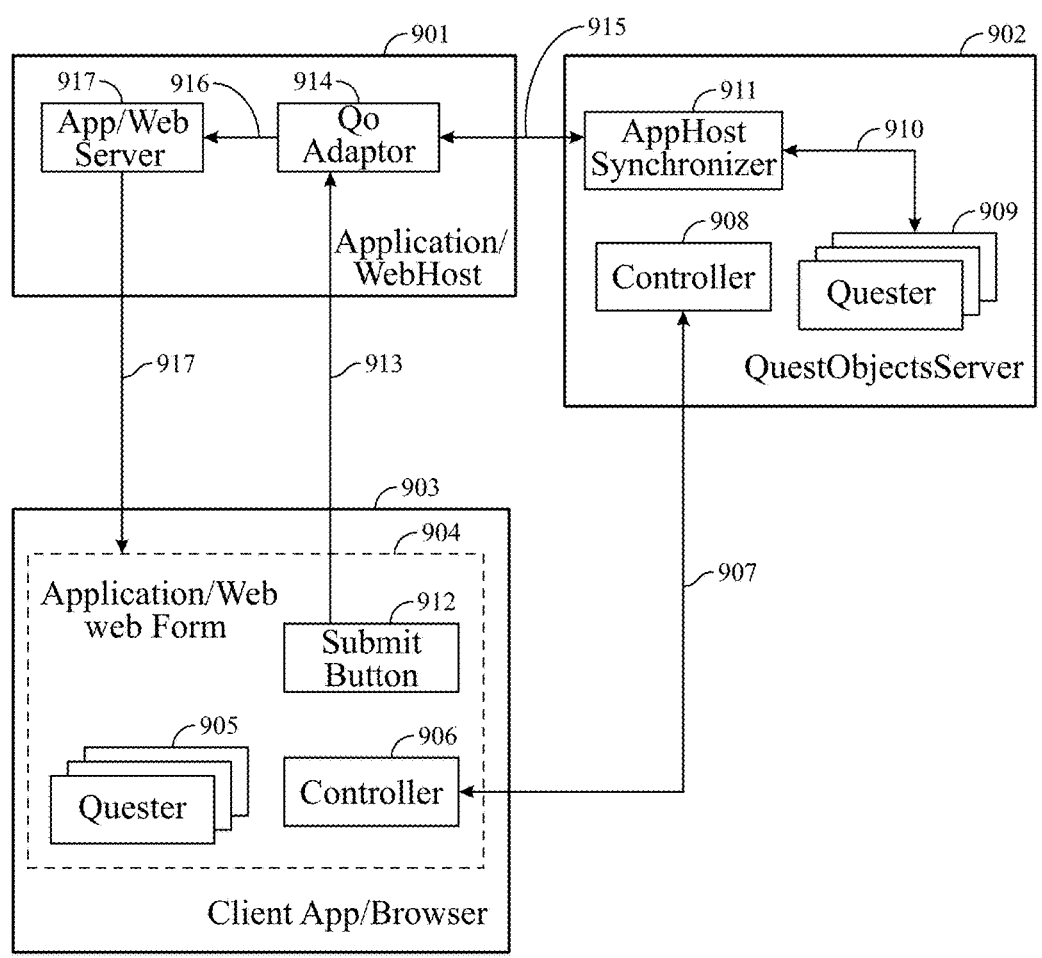
FIG. 9 shows a schematic of an application proxy system that enables the use of the invention in various client environments.

FIG. 9 shows a method for using the present invention in systems that have limited technical capabilities on the Client side, such as, for example, web browsers with embedded Java applets. If developers of client systems have not integrated Client components of the present invention into their client software, then Client components needed for the present invention must be present as Plug-Ins, DLL's, or an equivalent device, or they must be downloaded to the client computer as applets. These applets can be written in the Java language, when they are needed. For security reasons, such Client systems including web browsers usually do not allow 'foreign' software (i.e. software that is not an integral part of the web browser) to influence or change data entered by the user before it is sent to the application server (in this case the web server). Without an additional infrastructure on the server side, the present invention could not easily be used to enter data by users of systems with such limited technical capabilities on the client, because data entered and selected using the present invention would not be communicated to the existing application/web server. However, the modified invention and method described in FIG. 9, referred to as an Application Proxy, offers a solution.

Although the system depicted in FIG. 9 can be used to support clients in practically any server-based application server, and particularly in the case of a web server hosting an application used by end users to enter data that is partially retrieved using the present invention, the system is not limited to the web. The system provides an ideal solution for current web-based applications that consist of web browsers 903 on the client side and web host computers 901 with web server software 917 on the server side. To allow the web server 917 to access data selected using the present invention, this system provides a link between the web server and the QuestObjects Server 902. In this case, QuestObjects Server acts as a data-entry proxy between the existing client system (web browser) and the existing web server. Data entered by the client is submitted to the QuestObjects Adaptor instead of to the web server. The QuestObjects Adaptor then fills in the values of the Questers and passes the data to the web server. An Application Proxy is not required if the QuestObjects Client components can directly insert data into the client entry form on the web browser, as is the case on certain platforms that allow integration between Java applets or other components and JavaScript in the web browser.

In FIG. 9, the web server runs on a host computer 901 typically associated with a fixed IP address or an Internet host name. The web server is accessed by any number of clients using web browsers 903. To allow users to enter data and send data to the server, web pages make use of HTML forms 904. To use the present invention, user interface elements such as entry fields in these HTML forms are associated with Questers 905 in the form of browser Plug-Ins or Java Applets. Through a QuestObjects Controller 906 those Questers allow the user to access one or more QuestObjects Services hosted by a QuestObjects Server 902 using the protocol of the present invention 907. The Server Controller 908 forwards user actions generated in the Client Questers 905 to their corresponding Server Questers 909 that thus are always aware of data selected in the Client. When a Server Quester is first activated, it checks whether it is being used by a client system that requires the use of an Application Proxy. If the answer is yes, then the Quester creates a corresponding AppHost Synchronizer 911 that contacts the QuestObjects Adaptor 914 on the host computer 901 using a standardized protocol 915. The QuestObjects Adaptor then knows which QuestObjects Server to contact to retrieve QuestObjects data 915 after the user submits form data 912 to the application host using the existing application protocol 913, such as HTTP POST or HTTP GET. The QuestObjects Adaptor then replaces the appropriate form field data with the strings selected in the Server Questers 909 before forwarding this form data, now including data selected using the present invention, to the web server 917.

Design Implementation

The preceding detailed description illustrates software objects and methods of a system implementing the present invention. By providing a simple and standardized interface between Client components and any number of Content Engines that accept string-based queries, the present invention gives content publishers, web publishers and software developers an attractive way to offer unprecedented interactive, speedy, up-to-date and controlled access to content without the need to write an access mechanism for each content source.

In addition to acting as a standardized gateway to any content engine, the present invention can intelligently cache query results, distribute Services over a network of Servers, validate user and other client input, authorize user access and authenticate client software components as needed. These and other optional services are provided by the present invention without requiring additional work on the part of software developers or content publishers. Publishers can also keep track of usage statistics, on a per-user basis as required allowing flexible billing of content access. Content Access Modules allow software developers and vendors of Content Engines such as database vendors and search engine vendors to create simplified ways for developers and implementers of such content engines to disclose information through the present invention.

End users of the present invention experience an unprecedented level of user-friendliness accessing information that is guaranteed to be up-to-date while being efficiently cached for speedy access as the number of simultaneous users grows.

The present invention can be implemented on any client and server system using any combination of operating systems and programming languages that support asynchronous network connections and preferably but not necessarily preemptive multitasking and multithreading. The interface of the present invention as it appears to the outside world (i.e. programmers and developers who provide access to end users and programmers who provide Content Access Modules to Content Engines used by content publishers) is independent of both the operating systems and the programming languages used. Adapters can be built allowing the tiers of the system to cooperate even if they use a different operating system or a different programming language. The protocol of the present invention can be implemented on top of networking standards such as TCP/IP. It can also take advantage of inter-object communication standards such as CORBA and DCOM. The object model of the present invention can be mapped to most other programming languages, including Java, C++, Objective C and Pascal.

Third-party vendors of software development and database management tools can create components that encapsulate the present invention so that users of those tools can access its functionality without any knowledge of the underlying protocols and server-side solutions. For example, a 4GL tool vendor can add an 'auto-complete field' to the toolbox of the development environment allowing developers to simply drop a Questlet into their application. In order to function correctly, the auto-complete field would only need a reference to the QuestObjects Server and one or more QuestObjects Services, but it would not require any additional programming.

Examples of Applications in which the invention may be used include: Access system for database fields (for lookup and auto-complete services); Enterprise thesauri system; Enterprise search and retrieval systems; Enterprise reference works; Enterprise address books; Control systems for sending sensor readings to a server that responds with appropriate instructions or actions to be taken; Client access to dictionary, thesaurus, encyclopedia and reference works; Access to commercial products database; Literary quotes library; Real-time stock quote provision; Access to real-time news service; Access to Internet advertisements; Access to complex functions (bank check, credit card validation, etc); Access to language translation engines; Access to classification schemes (eg, Library of Congress Subject Headings); Access to lookup lists such as cities or countries in an order form; Personal address books; and, Personal auto-complete histories.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence. Access to complex functions (bank check, credit card validation, etc); Access to language translation engines; Access to classification schemes (eg, Library of Congress Subject Headings); Access to lookup lists such as cities or countries in an order form; Personal address books; and, Personal auto-complete histories.

The foregoing description of preferred embodiments of the present invention has been provided for the purposes of illustration and description. It is not intended to be exhaustive or to limit the invention to the precise forms disclosed. Obviously, many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A method, comprising:
   automatically detecting; on a client computer, modification by a user of a search query for content from one or more remote content sources in an entry field;
   sending a request message containing a string representing an incomplete version of the search query over a network to a server system comprising one or more computers serving a plurality of client computers,
   receiving, by the server system, the string;
   matching, by the server system, the string to entries in a cache of queries and search results previously retrieved from one or more content sources;

retrieving, by the server system, data indicative of the search results matching the incomplete version of the search query;

asynchronously sending, by the server system to the client computer a message containing at least a portion of the data indicative of the search results;

receiving, on the client computer, the message; and displaying at least a portion of the data indicative of the search results on the client computer.

2. The method of claim 1, wherein the entry field is displayed as part of a HTML page in a web browser on said client computer, and whereby the result message is received by said client computer without loading a new HTML page.

3. The method of claim 1, wherein the client computer is a cell phone or a personal organizer and the entry field is part of an application on said client computer.

4. The method of claim 1, wherein the data indicative of the search results is retrieved from the cache.

5. The method of claim 1, wherein at least a portion of the data indicative of the search results is retrieved from the one or more content sources.

6. The method of claim 1, wherein retrieving data indicative of the search results comprises: sending one or more content inquiries to one or more respective content sources; and receiving at least a portion of the data indicative of the search results in response to the one or more content inquiries.

7. The method of claim 6, wherein, after retrieving the data indicative of the search results, at least a portion of said data is stored in the cache for future use by a plurality of users.

8. The method of claim 1, whereby the client computer adds a qualifier to the query string, and whereby the server system uses said qualifier to retrieve appropriate search results based on both the query string and said qualifier.

9. The method of claim 1, wherein the content sources are one or more of a database, a search and retrieval system, a thesaurus, a reference work, an address book, a control system, a dictionary, an encyclopedia, a products database, a quotes library, a stock quote system, a news service, internet advertisements, a catalog, a complex function, a translation engine, a classification scheme, a lookup list, an auto-complete history, an algorithm, a directory, or a search engine.

10. A system for presenting to a user of a client computer remote search results from a server system consisting of one or more computers, the server system serving a plurality of client computers, comprising:

a server-based cache of queries and search results previously retrieved from one or more content sources;

a client object, in communication with a client software at the client computer, wherein the client object automatically detects modifications by a user of a search query for content from the one or more remote content sources in an entry field and sends over a network request messages containing a string representing consecutive incomplete versions of the search query to the server system;

a server object, in communication with server software on the server system, wherein the server object, in response to receiving each of the consecutive messages from the client system, matches the contained string to entries in the server-based cache, retrieves data indicative of the search results matching contained string, and asynchronously returns messages to the client object, each containing at least a portion of the data indicative of the search results for display of at least a portion thereof on the client computer.

11. The system of claim 10, wherein the entry field is part of a HTML page in a web browser on said client computer, and whereby each result message is received by said client computer without loading a new HTML page.

12. The system of claim 10, wherein the client computer is a cell phone or a personal organizer and the entry field is part of an application on said client computer.

13. The system of claim 10, wherein the data indicative of the search results is retrieved from the cache.

14. The system of claim 10, wherein at least a portion of the data indicative of the search results is retrieved from one or more content sources.

15. The system of claim 10, wherein retrieving data indicative of the search results comprises:

sending one or more content inquiries to one or more respective content sources; and receiving at least a portion of the data indicative of the search results in response to the one or more content inquiries.

16. The system of claim 10, wherein, after retrieving the data indicative of the search results, at least a portion of said data is stored in the cache.

* * * * *